(12) United States Patent
Layfield et al.

(10) Patent No.: US 7,578,541 B2
(45) Date of Patent: Aug. 25, 2009

(54) TRAILER SKIRT PANEL

(76) Inventors: Brian Layfield, 1 Chartwell Road, Oakville, Ontario (CA) L6J 3Z3; Joseph Mancina, 2479 Deer Run Avenue, Oakville, Ontario (CA) L6J 6L1; James Haws, 518 Golf Links Road, Ancaster, Ontario (CA) L9G 2N8; Andriy Prokudin, 695 Surrey Lane, Apt. 905, Burlington, Ontario (CA) L7T 3Z3

( * ) Notice: Subject to any disclaimer, the term of this patent is extended or adjusted under 35 U.S.C. 154(b) by 279 days.

(21) Appl. No.: 11/289,015

(22) Filed: Nov. 29, 2005

(65) Prior Publication Data

US 2007/0120397 A1    May 31, 2007

(51) Int. Cl.
B60J 1/00    (2006.01)
(52) U.S. Cl. .................................. 296/180.2; 296/180.4
(58) Field of Classification Search .............. 296/180.2, 296/180.4, 180.1, 180.5, 186.1, 191; 280/768
See application file for complete search history.

(56) References Cited

U.S. PATENT DOCUMENTS

| | | | | |
|---|---|---|---|---|
| D153,931 S | * | 5/1949 | Francis | D12/94 |
| 3,711,146 A | * | 1/1973 | Madzsar et al. | 296/180.2 |
| 4,611,847 A | * | 9/1986 | Sullivan | 296/180.2 |
| D317,425 S | * | 6/1991 | Vysotsky et al. | D12/97 |
| 5,280,990 A | * | 1/1994 | Rinard | 296/180.1 |
| D354,726 S | * | 1/1995 | Fitzgerald et al. | D12/181 |
| 5,609,384 A | * | 3/1997 | Loewen | 296/180.4 |
| 5,839,760 A | * | 11/1998 | Johnson | 280/768 |
| 5,921,617 A | * | 7/1999 | Loewen et al. | 296/180.4 |
| 5,947,520 A | * | 9/1999 | McHorse | 296/180.2 |
| 6,152,511 A | * | 11/2000 | Gustafson | 296/186.4 |
| 6,257,655 B1 | * | 7/2001 | Selby et al. | 296/186.2 |
| 6,644,720 B2 | * | 11/2003 | Long et al. | 296/180.4 |
| 6,742,616 B2 | * | 6/2004 | Leban | 296/180.4 |
| 6,837,536 B1 | * | 1/2005 | Schwartz | 296/180.4 |
| 6,932,419 B1 | * | 8/2005 | McCullough | 296/180.1 |
| 6,974,178 B2 | * | 12/2005 | Ortega et al. | 296/180.1 |
| 7,093,889 B2 | * | 8/2006 | Graham | 296/180.4 |
| 7,216,923 B2 | * | 5/2007 | Wong et al. | 296/180.2 |

(Continued)

*Primary Examiner*—Kiran B. Patel
(74) *Attorney, Agent, or Firm*—Thomas R. Vigil

(57) ABSTRACT

A skirt panel is provided herein for interconnection to another abutted similar skirt panel for attachment beneath a lower, outer longitudinally-extending edge of a trailer including a rear wheel assembly of a tractor-trailer rig, thereby to provide a continuous fairing extending downwardly from the trailer. The skirt panel includes a monolithic, generally-rectangular composite reinforced thermoplastic structure, having vertical lateral side edges configured and arranged for connection to associated vertical lateral side edges of abutting similar skirt panels. This provides a longitudinally-extending fairing for extending contiguously on each side of the trailer, a front face of the thermoplastic structure being provided with a plurality of longitudinally-extending, vertically-spaced-apart arcuate protrusions. The outer face of the thermoplastic panel preferably also is provided with dimples. The reinforcing comprising a panel secured to an inner face of the skirt panel and is provided with laterally-extending means whereby abutting skirt panels are secured to one another; whereby, when said fairing is secured to a lower portion of said trailer, the fairing extends downwardly from the trailer to from 60% to 80% of the distance to the road, so that a portion of any impinging air is directed laterally around the wheels of the rear wheel bogeys to reduce the aerodynamic drag of the trailer and of the wheel assembly.

15 Claims, 13 Drawing Sheets

U.S. PATENT DOCUMENTS

2006/0049198 A1* 3/2006 Guard .................. 221/24
2008/0061598 A1* 3/2008 Reiman et al. .......... 296/180.4
2008/0093887 A1* 4/2008 Wood .................. 296/180.4

* cited by examiner

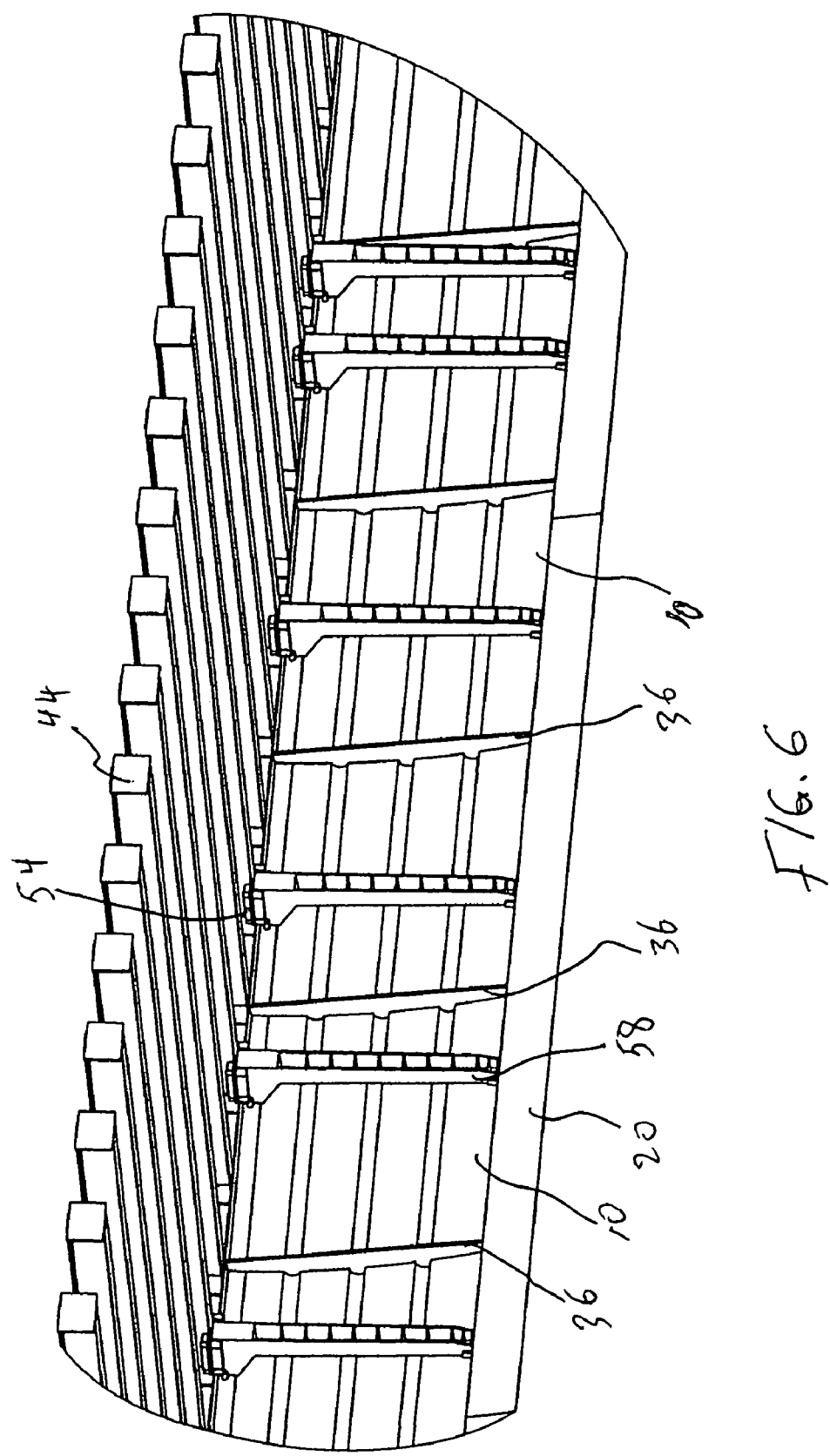

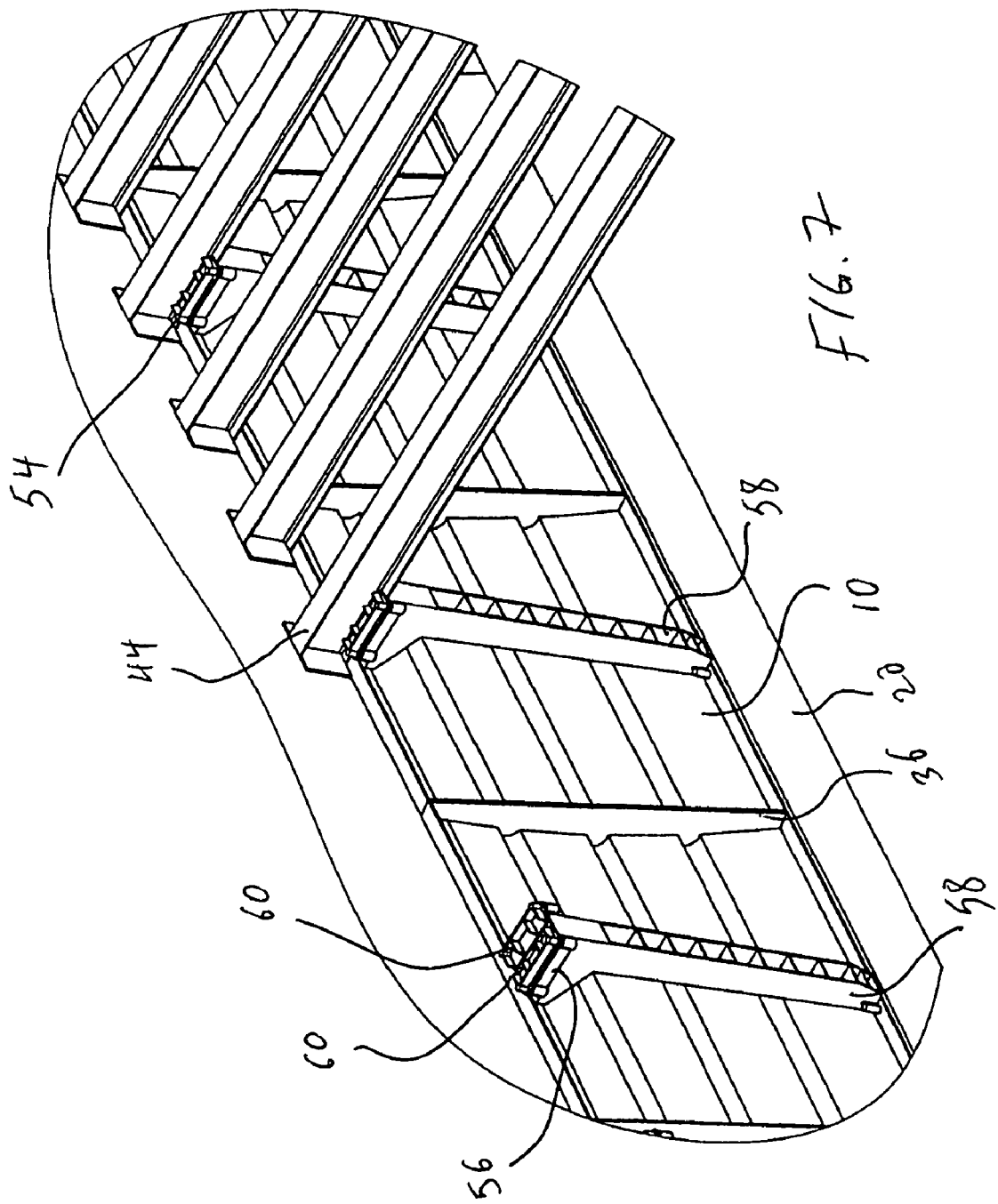

DETAIL D
SCALE 1:1

TRAILER SKIRT PANEL

BACKGROUND OF THE INVENTION

1. Field of the Invention

This invention relates to a skirt fairing, which is attachable beneath a lower, longitudinal edge of a trailer, and to methods for the production thereof. The present invention also relates to increased fuel efficiency and greater driving safety by deflecting and otherwise altering the airflow e.g., by creating laminar flow along the side and underneath the trailer of a tractor trailer rig or the like.

2. Description of the Prior Art

Modern cars are quite aerodynamically efficient but limited progress has been made with heavy-duty vehicles, trucks and the like. This is unfortunate principally because the fuel consumption by such a vehicle is high and any improvement in its aerodynamics performance is of great significance to transportation tractor-trailer rigs of the transportation industry in improving fuel economy. Acceleration and speed are, in general, of little interest in trucking. Existing performance in these fields is considered adequate. However fuel consumption is a major concern. It has recently been suggested that higher fuel prices, coupled with intense competition, may have the effect of closing down certain carriers. As the trailer of a large tractor-trailer rig is pulled forward by the tractor, a great deal of turbulence is created along the side and underneath the trailer as the vehicle disturbs the air. This turbulence results in increased resistance to forward movement of the tractor-trailer rigs, and thus to lower fuel efficiency. Work in a Low Speed Aerodynamics Laboratory in the early 1980's had demonstrated that smaller, but useful; drag reductions were still available from other treatments to the truck body or trailers than fairings or deflectors. These consisted of skirts that closed the body sides down toward the ground and beveled panels that reduced base drag. The skirts could provide a drag coefficient reduction of 0.06 per trailer on a tractor-trailer combination or about 0.02 on a straight truck. The rear panels (or the equivalent body beveling that has been used on buses) can produce a drag coefficient reduction of 0.06 on a straight truck, 0.08 on a bus, but only 0.04 on a trailer. The reason for the poor performance on the trailer is not known with certainty but may relate to the high-drag configurations on which it was first tested. The lower drag straight truck and the even lower-drag bus have much larger savings from this modification.

Moving freight by highway trucks has been increasing in volume for several years, and it appears that it will continue to increase in the future. This method of freight handling has proved to be more efficient and quicker than any other means in a large majority of situations. Nevertheless, this method has need of further improvement. A large problem is the energy needed to overcome wind resistance. It has been recognized that, by streamlining, vehicles can accomplish great savings in fuel expenses. Eddy currents are produced underneath the truck and its trailers, which add to the wind resistance. There is thus a great need to provide a maximum streamlining effect in order to reduce fuel consumption and operating costs.

Trucks, and particularly tractor-trailer rigs having multiple rear wheels, present a high resistance to air flow with the rear wheels, suspension, and other mechanical components at the rear of the vehicle interfering with the smooth flow of air around and under the vehicle. This interference creates turbulence and a high aerodynamic drag, which results in high fuel use and a high cost of operation. Furthermore, the turbulent flow can affect the trailers ability to track behind the trailer. This reduced driving stability is most prevalent in high crosswind conditions or when the trailer is empty. Furthermore, the turbulent flow, caused by yaw angle air traveling across the trailer bottom and releasing from the downwind side, creates a hazard for the drivers of other vehicles when it is raining or snowing, or the roadway is wet, for in such a situation, the rain or snow and any water splashed up from the roadway by the tires swirls around the tires and is thrown outwardly by the tires themselves and by the turbulent air flow. When this splashing and spraying water strikes the windshields of other vehicles, it lowers visibility for such motorists, and can cause them to lose control of their vehicles. Further, the spray raised by the rear tires reduces the truck driver's vision of the rear of the truck, making it more difficult for the truck driver to handle his vehicle when it's moving in traffic it is therefore advisable to improve the visibility of the driver.

It is well known that the fuel efficiency of any motor driven vehicle is directly related to the aerodynamic structure of the tractor-trailer rig and the amount of atmospheric turbulence caused by the movement of the vehicle. The greater the air turbulence created by the vehicle the greater the resistance, and the more fuel required to move the vehicle. In today's economy, fuel efficiency is of major concern and is particularly relevant when considered in terms of large tractor trailers used for transporting goods wherein the cost of fuel consumed moving the goods directly affects the market price of the goods. It is well known that improving the aerodynamics of a vehicle improves many aspects of its performance, particularly acceleration, top speed, fuel economy tracking stability and tire wear, driver comfort and ease of driving in cross winds.

Although fuel efficiency has become a primary concern in the recent decade because of fuel cost, a second major consideration is that of increasing the safety of operation of tractor-trailer rigs, particularly from the point of view of safety of other motorists sharing the road with such rigs. A major disadvantage of tractor trailers on the highway is that, unaltered, the turbulent air flow beneath and behind a tractor trailer is generally in a direction transverse to that of the movement of the tractor trailer. This means that in wet or snowy conditions, mist and/or snow is thrown laterally of the trailer causing a vision and turbulence problem for any motorist passing or being passed by the tractor-trailer rig.

Many modifications and accessories have been developed to improve the streamline of the airflow around a combined tractor-trailer truck. It is known that the amount of fuel required to haul a trailer over long distances can be reduced by equipping the trailer with a suitable aerodynamic fairing. An important such design is in the form of side shield or fairings, which are extended between the side of the tractor cab and the side of the trailer to provide a smooth transition surface there between. The side shields or fairings streamline airflow past the void space between the tractor and trailer by eliminating turbulence, which increases drag on the truck. Side shields eliminate the yaw angle air between rear of the tractor and the front of the trailer. Without side shields the air travels across the trailer face and releases from the downwind side. One type of fairing is mounted beneath each of the trailer's lower, outer longitudinal edges to extend between the trailer wheel assembly and the wheels of the tractor unit used to haul the trailer. Improved fuel economy is achieved while the trailer is hauled at highway speeds over long distances with fairings or side skirts mounted as aforesaid. Useful drag reductions were also said to be provided by skirts that closed the body sides down towards the ground to provide a reduced drag coefficient, or by bevelled panels that reduced base drag. Rear panels or body bevelling also reduced the drag somewhat, but apparently, not as much as by the use of skirts.

Many patents have issued which purport to have solved the above-identified problems. Among them, are the following:

Grout, Sr. et al, U.S. Pat. No. 3,743,343 disclosed a baffle means to be mounted on the undercarriage of the trailer forward of its rear axle(s) which channeled the airflow toward the rear and in the direction generally perpendicular to the rotational axes of the wheels, to mitigate the turbulence discharge from beneath the trailer in a direction generally transverse the trailer's movement. Besides the baffle means mounted on the sides forward of the rear axle, the Grout patent also disclosed a so-called "coagulating means" which was mounted to the undercarriage of the trailer rearwardly of the rear axle and which was designed to gather any turbulent discharge and direct it downwardly towards the road or pavement, thus attempting to minimize lateral discharge.

U.S. Pat. No. 4,021,069, patented May 3, 1977 by Hersh provided an aerodynamic drag reducing apparatus for mounting on the bluff, forward face of the trailing element of an over the road vehicle. The apparatus comprises a contoured member carried on the forward face and extending outwardly therefrom with its point of maximum extension substantially aligned for Impingement by an air stream. The portion of the surface displaced above the point of maximum extension describes a perturbed paraboloid of revolution with the rearward portions of the apparatus describing three sides of rectangle for aerodynamic merging with the top and side edges of the trailing element.

U.S. Pat. No. 4,262,953, patented Apr. 21, 1981 by McErlane, provided an airfoil or deflector panel for being mounted ahead of the rearmost set of wheels of a vehicle such as a truck or tractor-drawn trailer to direct air flow in a manner which reduces the relatively negative air pressure normally occurring behind a moving vehicle. The surface of the deflector, which is presented in the direction of vehicle motion, has a bilateral or compound convex curve a deflector panel of compound convexity mounted just forward of the rear axle or axles of a tractor drawn trailer.

U.S. Pat. No. 4,486,046, patented Dec. 4, 1984, by Whitney et al taught an airstream deflector assembly that mounted on the underside of a large vehicle, e.g., a semi-trailer or the like, to reduce drag, improve fuel economy, and reduce turbulence of rain or snow on a roadway traveled by the vehicle. Such assembly included a main panel which was essentially flat and was situated well forward of the following tires of the vehicle and deflecting the airstream downwardly primarily below the following axle and centers of such following tires. Such main deflection panel had mounted thereon four lateral airstream deflectors, two outboardly and two inboardly of the panel which served to concentrate the deflected airstream laterally toward the following tires of the vehicle and away from the "tunnel" between the tires. Both the main deflection panel and lateral deflectors were preferably angularly adjustable, either manually or remotely, with the preferred angularity of the main panel being with it lying in a plane which intersected the following tires slightly below their axis of rotation, and with the preferred angularity of the lateral deflectors being with them lying in planes substantially intersecting the inner faces of the following tires of the vehicle, e.g. at preferred angles relative to the direction of movement of the vehicle.

U.S. Pat. No. 4,518,188, patented May 21, 1985, by Witten provided an airflow improvement device for improving aerodynamic characteristics of a tractor-trailer truck. Such improvement included a side panel extending between the side of the tractor and the side of the trailer. A first end of the side panel was fixed to one of the tractor or trailer and the other end of the side panel was slidably restrained in a pocket structure mounted to the other of the tractor or the trailer so that the side panel will bend to form a smooth curved transition surface between the sides of the tractor and the trailer when the truck articulates to make a turn.

U.S. Pat. No. 4,640,541, patented Feb. 3, 1987 by FitzGerald et al, provided an air deflector for the rear wheels of vehicles, e.g., trucks and trailers. The deflector consisted of a fairing suspended beneath the truck or trailer body immediately in front of the rear wheels and extending completely across the width of the body. The surface of the fairing was curved in both a lateral and a vertical direction to deflect impinging air and entrained water or snow around or under the wheels. In a preferred form, the device was formed with a plurality of generally vertical grooves angled toward the centerline of the vehicle. The grooves directed impinging air downwardly and between the rear wheels. The air deflector served to suppress splashing and spraying of water from the roadway and of rain or snow, and reduced aerodynamic drag to improve handling and reduce fuel consumption.

U.S. Pat. No. 4,746,160 patented May 24, 1988 by Wiesemeyer, was directed to a highway truck with a semi-trailer and taught streamlined skirts on both sides of the vehicle that extended immediately above ground level, between the wheels.

U.S. Pat. No. 5,689,384, patented Mar. 11, 1997, by Loewen provided a fairing for use on a trailer. The trailer had a first member of the first edge that was hingedly attached to the trailer of the first edge. A second member had a first edge also hingedly attached to the trailer at that edge. A third member had a first edge hingedly attached to the trailer and arranged adjacent to the second member. The third member was telescopically receivable within the second member. The fairing was arranged along the lower edge of a trailer, adjacent the wheel.

U.S. Pat. No. 5,921,617, patented Jul. 13, 1999 by Loewen et al provided a fairing attachable beneath a lower, outer longitudinal edge of a trailer. The fairing had longitudinally extending forward and rearward sections. The rearward section can be moved longitudinally to adjustably locate its rearward edge in a selected position forward of the trailer's wheel assembly. Such adjustable positioning occurred automatically if the rearward section was coupled to, and longitudinally movable with, the support frame for the trailer's wheel assembly, thus maintaining the rearward edge of the fairing in the selected position whenever the trailer's wheel assembly is longitudinally adjusted relative to the trailer. A hinge mechanism coupled between the trailer and the fairing allowed pivotal displacement of each fairing section between lowered and raised positions. The lowered position was for long distance haulage of the trailer in order to achieve fuel economy. The raised position was for situations in which the trailer must be maneuvered over ramps, uneven terrain, etc. which might contact the underside of or otherwise interfere with the fairing.

U.S. Pat. No. 6,257,655, patented Jul. 10, 2001 by G. L. Selby, et al provided a protective skirt for an open frame trailer adapted to transport vehicles. The trailer included a wheeled chassis supporting a frame and track assembly. The trailer had a front-end adapted to be mounted in towing engagement on a tractor truck, a rear end adapted for receiving vehicles to be carried, and a middle section including the frame and track superstructure for supporting the vehicles. The protective skirt included a pair of first skirt sections mounted one on each side of the chassis in screening position at the trailer front end, a pair of second skirt sections mounted on the chassis one on each side thereof in screening position at the trailer middle section, a pair of third skirt sections mounted in screening position one on each side of the chassis above the wheels, and a pair of fourth skirt sections mounted on the chassis one on each side in screening position at the trailer rear section. The skirt assembly protected vehicles carried on the trailer against damage from rocks and road debris.

U.S. Pat. No. 6,644,720, patented Nov. 11, 2003 by Long et al, provided a streamlined highway truck including a tractor with a cab having a roof and two side sections and a semi trailer having a front, a top and two side sections and being pivotally joined by a fifth wheel to the tractor. The tractor had a top panel extending from the roof to adjacent the front edge of the top of the semi trailer and two side panels extending from the side sections of the tractor to the front edges of the respective side sections of the semi trailer. The side panels extended vertically from adjacently above ground level to a juncture with the top panel. Each of the side panels included a rigid portion connected to the side section of the cab and a vertical strip portion hingedly connected to the rigid portions and adapted to swing outwardly to accommodate a specific angular relationship between the side panel of the tractor and the adjacent side section of the semi trailer. The strip portions were spring biased to remain aligned with their respective rigid portions. The semi trailer had side panels extending downwardly from the bottom of the side sections to adjacently above ground level from adjacent the tractor wheels under the front of the semi trailer to adjacent the semi trailer wheels adjacent the rear of the semi trailer. Each of the above patented devices, though providing improvements in the art, have failed to adequately provide an aerodynamic side panel structure which presented a durable and easy to use fixed structure for accomplishing airflow improvement around a tractor-trailer truck. Some disclosed structures used very rigid side panels, which were difficult to maintain in position, and were awkward to handle. Some structures required cumbersome tensioning means to maintain the skirt or deflector in position.

SUMMARY OF THE INVENTION

The present invention seeks to improve on the prior art.

The principal aim of the present invention is to provide structures for reducing aerodynamic drag on road vehicles, and, more particularly, to providing air deflector structures for creating better laminar air flow along the sides of vehicles, and, directing air flow around the rear suspension, axles, wheels, tires, brake chambers, slack adjusters, and hangers under vehicles, e.g., trucks and trailers. Specifically, this invention aims to provide relatively-flexible side panels, which extend under a trailer to within 0.8 of the distance to the road surface, to provide improved aerodynamic airflow characteristics.

It is an object of one aspect of the present invention to overcome the problem of splash and spray of water by the rear wheels of trucks and trailers. It is an object of another aspect of the invention to provide an air deflector for vehicles to reduce the outward spraying of road water and rain.

An object of another aspect of the invention is to reduce the aerodynamic drag of vehicles, e.g., trucks and tractor-trailer rigs.

An object of a further aspect of the present invention is to provide an air deflector for vehicles to provide a smooth flow of air around the rear wheels and suspension thereof to reduce air deflector drag.

An object of another aspect of the present invention is to reduce the aerodynamic drag of vehicles e.g., trucks and tractor-trailer rigs.

An object of another aspect of the present invention is to provide increased fuel efficiency and greater driving safety by deflecting and otherwise altering the airflow to create laminar airflow along the sides of the trailer of a truck trailer rig or the like.

An object of another aspect of the present invention is to provide greater trailer tracking, stability and reduced tire wear of vehicles, e.g., trucks and tractor-trailer rigs.

An object of another aspect of the present invention is to eliminate the yaw angle air crossing under the trailer and releasing from the downwind side of the trailer.

The present invention relates, in general, to devices for reducing aerodynamic drag on road vehicles, and, more particularly, to an air deflector to eliminate the yaw angle air crossing under the trailer and releasing from the downwind side of the trailer, and, for directing air flow around the rear suspension, axles, wheels, tires, brake chambers, slack adjusters, and hangers under vehicles e.g., trucks and trailers.

STATEMENTS OF INVENTION

One embodiment of the present invention provides a skirt panel for attachment beneath a lower, outer longitudinal right hand and left hand edges of a trailer of a tractor-trailer rig including optional right hand and left hand rear wheel bogeys. The skirt panel includes a monolithic, generally-rectangular composite thermoplastic/metal reinforcing structure, having longitudinally-extending forward and rearward sections for connection to associated sections of similar said skirt panels to provide a generally-rectangular skirt panels for extending contiguously on each side of the trailer. The thermoplastic portion includes a facing provided with a plurality of longitudinally-extending, vertically-spaced-apart arcuate protrusions and preferably also dimples within the flat portion of the facing and/or the arcuate protrusions. The metallic portion is a reinforcing backing. The skirt panel is configured and arranged to extend downwardly up to about 60% to about 80%, or about no more than 10 inches of the distance to the road surface from the trailer, so that a portion of any impinging air is directed laterally along the trailer and the rear wheel bogeys and the remaining impinging air is directed laterally around the wheels of the rear wheel bogeys to reduce the aerodynamic drag of said trailer and of said wheel assembly.

By an aspect of this embodiment of the present invention, the skirt panel further includes bracket means for rigidly securing the skirt panel to the trailer.

By an aspect of this embodiment of the present invention, the thermoplastic material of the skirt panel is co-extruded ABS (acrylic/butadiene/styrene resin) with a cap of a styrene acrylonitrile copolymer which has been impact-modified with acrylic ester rubber.

By an aspect of this embodiment of the present invention the metal portion of the skirt panel comprises stamped and formed steel vertical truss and clamp angles which are fastened in a suitable manner to the thermoplastic portion.

By an aspect of this embodiment of the present invention, the skirt panel includes an optional synthetic plastic component attached to the lower edge of the skirt panels to allow panel flexing over road objects, e.g., curbs, railroad tracks and below grade loading docks.

By an aspect of this embodiment of the present invention synthetic plastic is a thermoplastic polymer. The thermoplastic polymer may preferably be flex PVC (polyvinyl chloride) or extruded Santoprene (the Trademark of Advanced Elastomer Systems LP for its brand of TPE-thermoplastic elastomers—a diverse family of rubber-like materials which can be processed and recycled like thermoplastic materials).

By an aspect of this embodiment of the present invention, the thickness of the thermoplastic material of the skirt panel is about 0.187".

Another embodiment of the present invention provides a trailer which is equipped with a plurality of contiguous skirt panels depending below the right hand and left hand sides thereof, the skirt panels having the structure as described hereinabove.

Yet another embodiment of the present invention provides a first method of vacuum forming a skirt panel. The method includes the following steps: providing an aluminum mould; providing a thin sheet of thermoplastic material; clamping the thin sheet of thermoplastic material in a clamp frame; introducing the clamped thin sheet of thermoplastic material into a heating oven; heating the oven to a temperature greater than the softening temperature of said thermoplastic material; placing the heated thin sheet of thermoplastic material over the aluminum mould; forcing the mould into the hot thin sheet of thermoplastic material until a sealing flange air seal is formed around the outer edge of said mould; drawing a vacuum from inside the mould, thereby to force the hot sheet of thermoplastic material to form around the contours of the mould.; reducing the temperature of the hot sheet of thermoplastic material to a suitable temperature below the softening temperature of the thermoplastic material; opening the clamp frame and removing the moulded first intermediate skirt panel from the mould;. trimming off excess material from the moulded first intermediate skirt panel and drilling suitable mounting holes therein, thereby to provide a second intermediate skirt panel; providing a metal reinforcement which is stamped and formed; bolting the stamped and formed metal reinforcement to the interior of the second intermediate skirt panel, thereby to form vertical truss and clamp angles on the interior of the second intermediate skirt panel, thereby to form a third intermediate skirt panel; extruding a synthetic plastic panel; and attaching the extruded synthetic plastic panel to the lower edge of the third intermediate skirt panel, thereby to provide a final skirt panel, which allows panel flexing over road objects.

Yet another embodiment of the present invention provides a second method of vacuum forming a skirt panel. The second method includes the following steps: providing a double aluminum mould; providing two thin sheets of a thermoplastic material; clamping an associated thin sheet of the thermoplastic material in each of an associated clamp frame; fixing the two clamp frames in spaced-apart relationship one above the other with minimal clearance there between; introducing the two spaced-apart clamped thin sheets of thermoplastic material into a heating oven; heating the oven to a temperature greater than the softening temperature of the thermoplastic material; placing each heated sheet of thermoplastic material over an associated half of the aluminum moulds; forcing each mould half into an associated each hot sheet of thermoplastic material until a sealing flange air seal is formed around the outer edge of each mould half; drawing a vacuum from inside each mould half; while the hot thin sheet of thermoplastic material is still hot, clamping the two mould halves together; applying enough pressure to the clamped two mould halves to bond the areas of contact between said two hot thermoplastic materials to form a permanent single hollow skirt pane; reducing the temperature of thermoplastic material to a suitable temperature below the softening temperature of the hot thermoplastic material; opening the two mould halves; opening the clamps and removing the moulded first intermediate skirt panel from said mould; trimming off excess material off from the moulded first intermediate skirt panel and drilling suitable mounting holes therein, thereby to provide a second intermediate skirt panel; providing a metal reinforcement which is stamped and formed, bolting the stamped and formed metal reinforcement which to the interior of the second intermediate skirt panel, thereby to form vertical truss and clamp angles on the interior of said formed second intermediate skirt panel, and thereby to form a third intermediate skirt panel;

extruding a synthetic plastic panel; and attaching the extruded synthetic plastic panel to the lower edge of the third intermediate skirt panel, thereby to provide a final skirt panel, which allows panel flexing over road objects.

Yet another embodiment of the present invention provides a third method of forming a skirt panel. The third method includes the following: providing a high pressure mould; producing a first component face of said skirt panel by injection moulding a thermoplastic material in the high pressure mould; producing a second component support strut of said skirt panel by injection moulding a thermoplastic material in the high pressure mould; extruding a third component thermoplastic material track of said skirt panel; attaching the extruded thermoplastic track to the underside of the trailer; attaching the injection moulded face to the extruded material track of the skirt panel, attaching the injection moulded strut to the extruded material track and panel face of the skirt panel, thereby to provide a first intermediate skirt panel; providing and attaching an injection moulded face to the extruded material track of the skirt panel, attaching the injection moulded strut to the extruded material track and panel face of the skirt panel, attaching by means of snaps or suitable fasteners to the lateral side of the first intermediate skirt panel, thereby to form a second intermediate skirt panel having vertical trusses; extruding a third synthetic plastic panel; attaching the extruded synthetic plastic panel to the lower edge of the second intermediate skirt panel thereby to form an optional final skirt panel having a strut and a depending thermoplastic material panel on the lower edge thereof, thereby to allow panel flexing over road objects and achieve maximum aerodynamic drag reduction.

Yet another embodiment of the present invention provides a fourth method of forming a skirt panel. The fourth method includes the following: providing a structural web mould; producing a first component face of the skirt panel by injection moulding a thermoplastic material in the structural web mould, producing a second component support strut of the skirt panel by injection moulding a thermoplastic material in the structural web mould; extruding a third component thermoplastic material track of said skirt panel; attaching the injection moulded face to the extruded material track of the skirt panel, attaching the injection moulded strut to the extruded material track and panel face of the skirt panel, thereby to provide a first intermediate skirt panel; providing and attaching an injection moulded face to the extruded material track of the skirt panel, attaching the injection moulded strut to the extruded material track and panel face of the skirt panel, attaching by means of snaps or suitable fasteners to the lateral side of the first intermediate skirt panel, thereby to form a second intermediate skirt panel having vertical trusses; extruding a third synthetic plastic panel; attaching the extruded synthetic plastic panel to the lower edge of the second intermediate skirt panel thereby to form an optional final skirt panel having a strut and a depending thermoplastic material panel on the lower edge thereof, thereby to allow panel flexing over road objects and achieve maximum aerodynamic drag reduction.

A broad aspect of the present invention provides a skirt panel for interconnection to another similar abutting skirt panel for attachment beneath a lower, outer longitudinally-extending edge of a trailer including a rear wheel assembly of a tractor-trailer rig, thereby to provide a continuous fairing extending downwardly from said trailer. The skirt panel includes, firstly, a monolithic, generally-rectangular composite reinforced thermoplastic structure, having vertical lateral side edges which are configured and arranged for connection to associated vertical lateral side edges of abutting similar skirt panels, thereby to provide a longitudinally-extending fairing for extending contiguously on each side of said trailer. The front face of the thermoplastic structure being provided with a plurality of longitudinally extending, vertically spaced apart arcuate protrusions. The front face of the thermoplastic structure is also preferably provided with a plurality of dimples, on the flat face and/or the arcuate protrusions. Secondly, the skirt panel is provided with reinforced lateral edges, the reinforcing panel comprises a panel, preferably an open lattice panel, which is secured to an inner face of the skirt panel. The reinforcing panel is provided with laterally extending means, whereby abutting such skirt panels are secured to one another. Thus, when the fairing is secured to a lower portion of the trailer, the fairing extends downwardly from said trailer to from 60% to 80% of the distance to the road, preferably to no closer than 10 inches from the road surface. Because of such fairing structure a portion of any impinging air is directed laterally around the wheels of the rear wheel bogeys to reduce the aerodynamic drag of said trailer and of said wheel assembly. By a variant thereof, an upper edge of said skirt panel includes means for rigidly securing the skirt panel to the trailer.

By a variant thereof, the means for rigidly securing the skirt panel to the trailer comprises snap members.

By a variant thereof, each vertical edge of the skirt panel includes a reinforcing and connecting truss or flange having connection points to enable abutting similar skirt panels to be rigidly connected to one another.

By a variant thereof, the truss is formed of stamped metal.

By a variant thereof, the truss is of an open lattice structure.

By a variant thereof, the stamped metal comprises galvanized steel vertical truss and securement members, which are secured to the thermoplastic portion of the skirt panel.

By a variant thereof, two lateral vertical side edges extend inwardly from the rear face thereof, and wherein upper and lower edges thereof are integrally connected to the two inwardly extending lateral edges.

By a variant thereof, the skirt panel includes a support strut connected to the interior face at the bottom edge and secured to the interior face adjacent the top edge thereof.

By a variant thereof, the support strut includes an I-beam clamp at the upper edge thereof.

By a variant thereof, the inner face of said strut at the upper edge thereof includes means to connect the strut to the inner face of the skirt panel.

By a variant thereof, the thermoplastic is selected from the group consisting of co-extruded ABS with a cap of a styrene acrylonitrile copolymer which has been impact-modified with acrylic ester rubber, high molecular weight polyethylene, polypropylene and TPO.

By a variant thereof, the skirt panel includes a thinner, more flexible synthetic plastic lower panel, the thinner, more flexible synthetic plastic lower panel being attached to the lower edge of said skirt panel, thereby to allow panel flexing over road objects, e.g., curbs, railroad tracks and below grade loading docks.

By a variant thereof, the synthetic plastic comprises a thermoplastic elastomer.

By a variant thereof, the thermoplastic elastomer comprises flex PVC.

By a variant thereof, the skirt panel is about 0.187 inches thin.

Another broad aspect of the present invention provides a method of vacuum forming a skirt panel for interconnection to an abutting similar skirt panel for attachment beneath a lower, outer longitudinally-extending edge of a trailer including a rear wheel assembly of a tractor-trailer rig, thereby to provide a continuous fairing extending downwardly from said trailer. The method includes the following sequential steps: providing an aluminum mould; providing a thin sheet of thermoplastic material; clamping the thin sheet of thermoplastic material in a clamp frame; introducing the clamped thin sheet of thermoplastic material into a heating oven;

heating the oven to a temperature greater than the softening temperature of the thermoplastic material; placing the heated thin sheet of thermoplastic material over said aluminum mould.;

forcing the mould into the hot thin sheet of thermoplastic material until a sealing flange air seal is formed around the outer edge of the mould; drawing a vacuum from inside the mould, thereby to force the hot sheet of thermoplastic material to form around the contours of the mould.; reducing the temperature of the hot sheet of thermoplastic material to a suitable temperature below the softening temperature of the thermoplastic material; opening the clamp frame and removing the moulded formed first intermediate skirt panel from the mould; trimming off excess material from the formed first intermediate skirt panel and drilling suitable mounting holes therein, thereby to provide a second intermediate skirt panel; providing a metal reinforcement which is stamped and formed; securing the stamped and formed metal reinforcement to the interior of the formed skirt panel, thereby to form vertical truss and clamp members on the interior of the formed second intermediate skirt panel, and thereby to form the skirt panel.

Another broad aspect of the present invention provides a method of vacuum forming a skirt panel for interconnection to a similar abutting skirt panel for attachment beneath a lower, outer longitudinally-extending edge of a trailer including a rear wheel assembly of a tractor-trailer rig, thereby to provide a continuous fairing extending downwardly from the trailer. The method includes the following sequential steps: providing a double aluminum mould; providing two thin sheets of a thermoplastic material; clamping an associated thin sheet of the thermoplastic material in each of an associated clamp frame; fixing the two clamp frames in spaced-apart relationship one above the other with minimal clearance therebetween; introducing the two spaced-apart clamped thin sheets of thermoplastic material into a heating oven; heating the oven to a temperature greater than the softening temperature of the thermoplastic material; placing each such heated sheet of thermoplastic material over an associated half of said aluminum mould; forcing each such mould half into an associated each such hot sheet of thermoplastic material until a sealing flange air seal is formed around the outer edge of each said mould half;

drawing a vacuum from inside each such mould half; while such hot thin sheet of thermoplastic material is still hot, clamping the two mould halves together; applying enough pressure to the clamped two mould halves to bond the areas of contact between the two hot thermoplastic materials to form a permanent single hollow skirt panel; reducing the temperature of the thermoplastic material to a suitable temperature below the softening temperature of the hot thermoplastic material; opening the two mould halves; opening the clamps and removing of the moulded first intermediate skirt panel from the mould; trimming off excess material from the moulded first intermediate skirt panel and drilling suitable mounting holes therein, thereby to provide a second intermediate skirt panel; providing a metal reinforcement which is stamped and formed; securing the stamped and formed metal reinforcement to the interior of the formed skirt panel, thereby to form vertical truss and clamp members on the interior of the formed second intermediate skirt panel, and thereby to form the skirt panel.

Another broad aspect of the present invention provides a method of injection moulding a skirt panel for interconnection to a similar abutting skirt panel for attachment beneath a lower, outer longitudinally extending edge of a trailer including a rear wheel assembly of a tractor-trailer rig, thereby to provide a continuous fairing extending downwardly from the trailer. The method includes the following sequential steps: providing at least one high pressure mould; producing a first component face panel of the skirt panel by injection moulding a thermoplastic material in said at least one high pressure mould; producing a second component support strut of the skirt panel by injection moulding a thermoplastic material in at least one high pressure mould; extruding a third component thermoplastic material track of said skirt panel; attaching the injection moulded face panel to said extruded material track of said skirt panel, thereby to provide a first intermediate skirt panel; providing a means to fasten a vertical edge of the first intermediate skirt panel to said tractor; and fastening such means to fasten a vertical edge of the first intermediate skirt panel to the tractor to the vertical edge of the first intermediate skirt panel, thereby to form the skirt panel having both vertical and horizontal support structures.

Another broad aspect of the present invention provides a method of injection moulding a skirt panel for interconnection to a similar said skirt panel for attachment beneath a lower, outer longitudinally-extending edge of a trailer including a rear wheel assembly of a tractor-trailer rig, thereby to provide a continuous fairing extending downwardly from the trailer. The method includes the following sequential steps: providing a structural web mould; producing a first component face panel of the skirt panel by injection moulding a thermoplastic material in the structural web mould; providing a high pressure mould; producing a second component support strut of the skirt panel by injection moulding a thermoplastic material in the high pressure mould; extruding a third component thermoplastic material track of the skirt panel; attaching the first component injection moulded face panel and the second component support strut to the extruded material track of said skirt panel, thereby to provide a first intermediate skirt panel; providing a means to fasten a horizontal edge of the first intermediate skirt panel to said trailer; and the means to fasten a vertical edge of the first intermediate skirt panel to the vertical edge of the second intermediate skirt panel, thereby to form said skirt panel having both vertical and horizontal support structures.

By a variant thereof, the method includes the additional steps of: extruding a thin synthetic plastic panel; and attaching the extruded synthetic plastic panel to the lower edge of the skirt panel, thereby to provide a final skirt panel, which allows panel flexing over road objects and to achieve further fuel savings.

By a variant thereof the moulds contain inner copper cooling and heating lines which aid in the manufacturing method.

By a variant thereof the moulds contain an insert which can be removed to form a side marker light panel.

By a variant thereof the thermoplastic is selected from the group consisting of co-extruded ABS with a cap of a styrene acrylonitrile copolymer, which has been impact-modified with acrylic ester rubber, high molecular weight polyethylene, polypropylene and TPO.

By a variant thereof the heating to a suitable temperature, is about 320?F.

By a variant thereof the cooling is down to a temperature of about 140?F.

By a variant thereof the extruded synthetic polymer is flex PVC (polyvinyl chloride).

By a variant thereof the thermoplastic elastomer is a thermoplastic elastomer which can be processed and recycled like thermoplastic materials.

Another broad aspect of the present invention provides a trailer of a tractor-trailer rig to which is fastened a fairing consisting of a plurality of contiguous skirt panels depending below the right hand and left hand sides thereof to from 60% to 80% of the distance to the road, so that a portion of any impinging air is directed laterally around the wheels of the rear wheel bogeys to reduce the aerodynamic drag of the trailer and of the wheel assembly, the skirt panels having the structure as described above for the broad aspect and the variants thereof.

By a variant thereof the fairing terminates about 10 inches from the surface of the road By an aspect of the first and second method embodiments of the present invention, the moulds contain inner copper cooling and heating lines, which aid in the manufacturing method.

By an aspect of the first and second method embodiments of the present invention, the moulds contain an insert, which can be removed to form a side marker light panel.

By an aspect of all the method embodiments of the present invention, the thermoplastic material is co-extruded ABS (acrylic/butadiene/styrene resin) with a cap of a styrene acrylonitrile copolymer which has been impact-modified with acrylic ester rubber.

By an aspect of all the method embodiments of the present invention, the thermoplastic material can be TPO, HMWPE, PP, PC/ABS, glass reinforced PP or glass reinforced ABS.

By an aspect of all the method embodiments of the present invention, the heating to a suitable temperature is about 320° F. for ABS material.

By an aspect of all the method embodiments of the present invention, the cooling is down to a temperature of about 140° F.

By an aspect of all the method embodiments of the present invention, the extruded synthetic polymer is flex PVC. (polyvinyl chloride).

By an aspect of all the method embodiments of the present invention, the extruded synthetic polymer is a thermoplastic elastomer, which can be processed and recycled like thermoplastic materials.

Thus, as noted above, aspects of the present invention overcome the afore-mentioned inadequacies by providing a pair of semi-flexible side panels for a tractor-trailer rig which extend under the tractor-trailer rig at both side surfaces thereof to improve their airflow dynamics when traveling at high speeds and reduce drag. The panels are sufficiently rigid to be substantially self-supporting from an attachment to the tractor-trailer rig, while retaining sufficient flexibility to bend when the rig maneuvers over objects, e.g. curbs, railway tracks, below grade loading docks, etc. The directed air flows parallel to the horizontal axis of the trailer in a laminar fashion, and causes air to release at the rear of the tractor-trailer rig. The laminar airflow also serves to allow water, which has been splashed by the tires to exit along the horizontal axis of the trailer, thereby substantially reducing the outward spray of water normally produced by the tires.

BRIEF DESCRIPTION OF THE SEVERAL VIEWS OF THE DRAWINGS

The invention is illustrated, by way of example, in the drawings in which:

FIG. 6 is yet another isometric interior underside view of a portion of a tractor-trailer rig having a plurality of contiguous skirt panels as depicted in FIG. 1 attached thereto, and showing another means for fastening the skirt panel to the tractor-trailer rig;

FIG. 7 is a further isometric interior underside view of a portion of a tractor-trailer rig having a plurality of contiguous skirt panels as depicted in FIG. 1 attached thereto, and showing a further means for fastening the skirt panel to the tractor-trailer rig;

DESCRIPTION OF THE PREFERRED EMBODIMENTS

Figure 1:
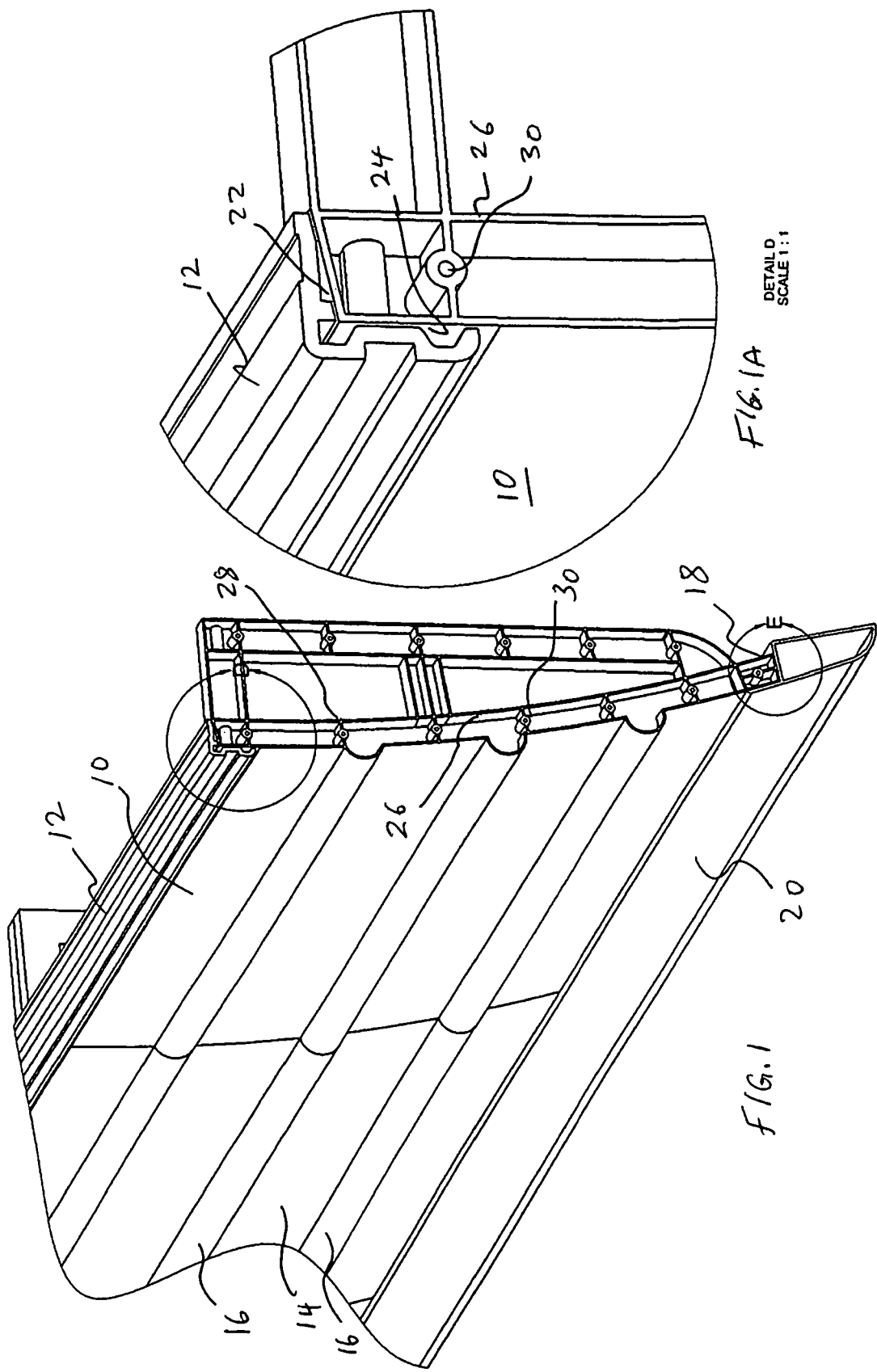
FIG. 1 is an isometric frontal view of a typical skirt panel with one form of reinforcing and interconnection means, according to one embodiment of the present invention, and including, as FIG. 1A, an enlarged view of the extruded cap and one connection point.
Figure 2:
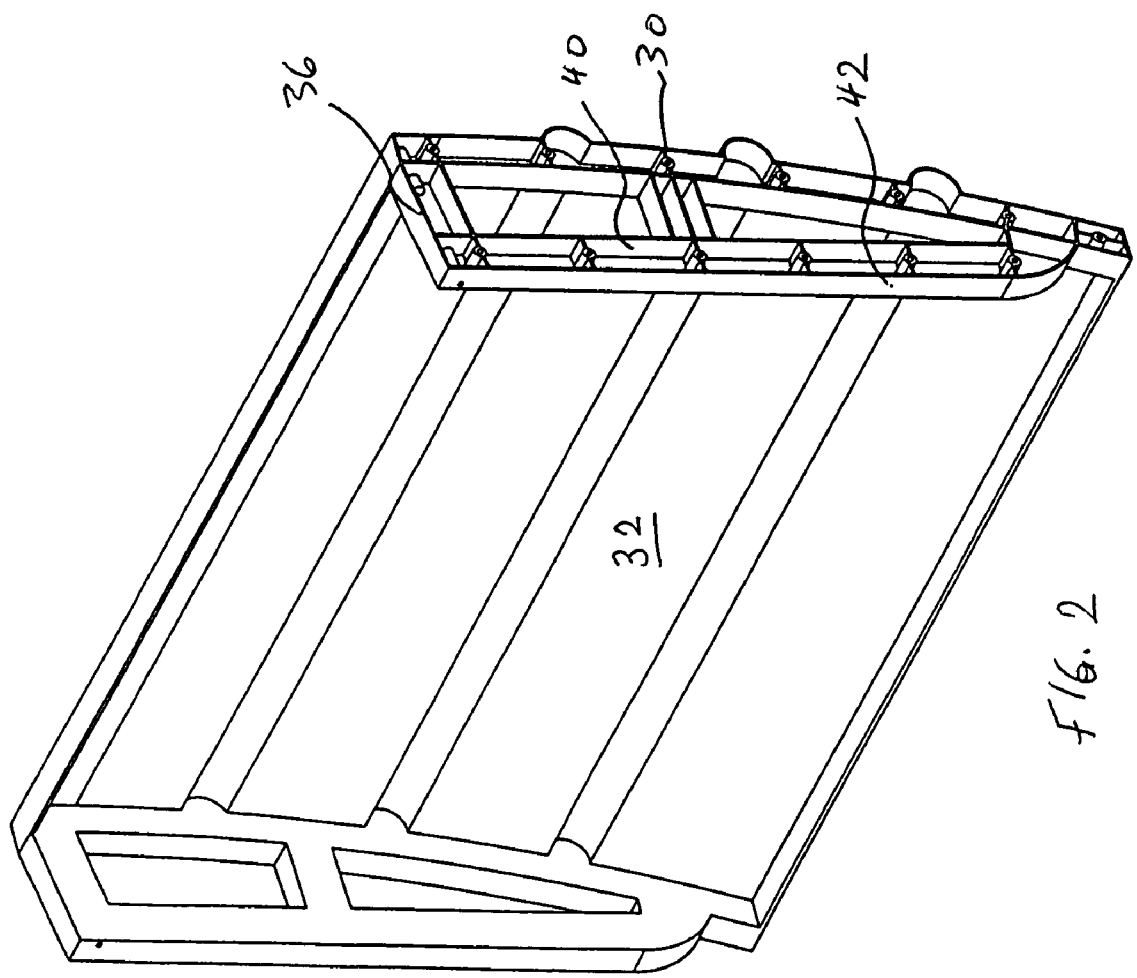
FIG. 2 is an isometric rear view of the typical skirt panel of FIG. 1.

Description of FIGS. 1, 1A and 2

As seen in FIGS. 1, 1A and 2, the skirt panel 10 is a generally rectangular flat piece of thin thermoplastic material, e.g., ABS (acrylic/butadiene/styrene resin) with a separate extruded but secured, as by thermoplastic fusion, LURAN or CENTREX UV-resistant cap 12. The exterior face 14 of the skirt panel 10 is formed with integral, spaced-apart, horizontal arcuate protrusions 16. The lower edge 18 of the skirt panel 10 has secured thereto by any suitable means, e.g., by a Plastite screw combination, a monolithic base of an extruded, flexible lower panel component 20 of e.g., SANTOPRENE or PVC. As previously described, this allows flexing of the final skirt panel 10 over road objects (e.g., curbs, rail road tracks and below grade loading docks).

As seen in FIG. 1A, the cap extrusion 12 is suitably secured to the top edge 22 and the top face 24 of the skirt panel 10 in any suitable manner, e.g., by thermoplastic fusion. The exterior facing edge 26 of the reinforcing and connecting truss 28 is provided with a plurality of outwardly extending connection points 30. By means of these connection points 30 two abutting skirt panels 10 may be interconnected by suitable means, e.g., Plastite screws (not seen).

The rear face 32 of the skirt panel 10, seen more clearly in FIG. 2, has secured thereto by any suitable means, a pair of lateral edge vertical reinforcing trusses 36. These trusses 36 include, not only the plurality of outwardly-extending connection points 30, but also a plurality of internal connection points 38, integrally formed between two spaced-apart vertical bars 40, 42. These internal connection points 38 also serve as means to connect two abutting skirt panels 10 by suitable means, e.g., Plastite screws (not seen).

Figure 3:
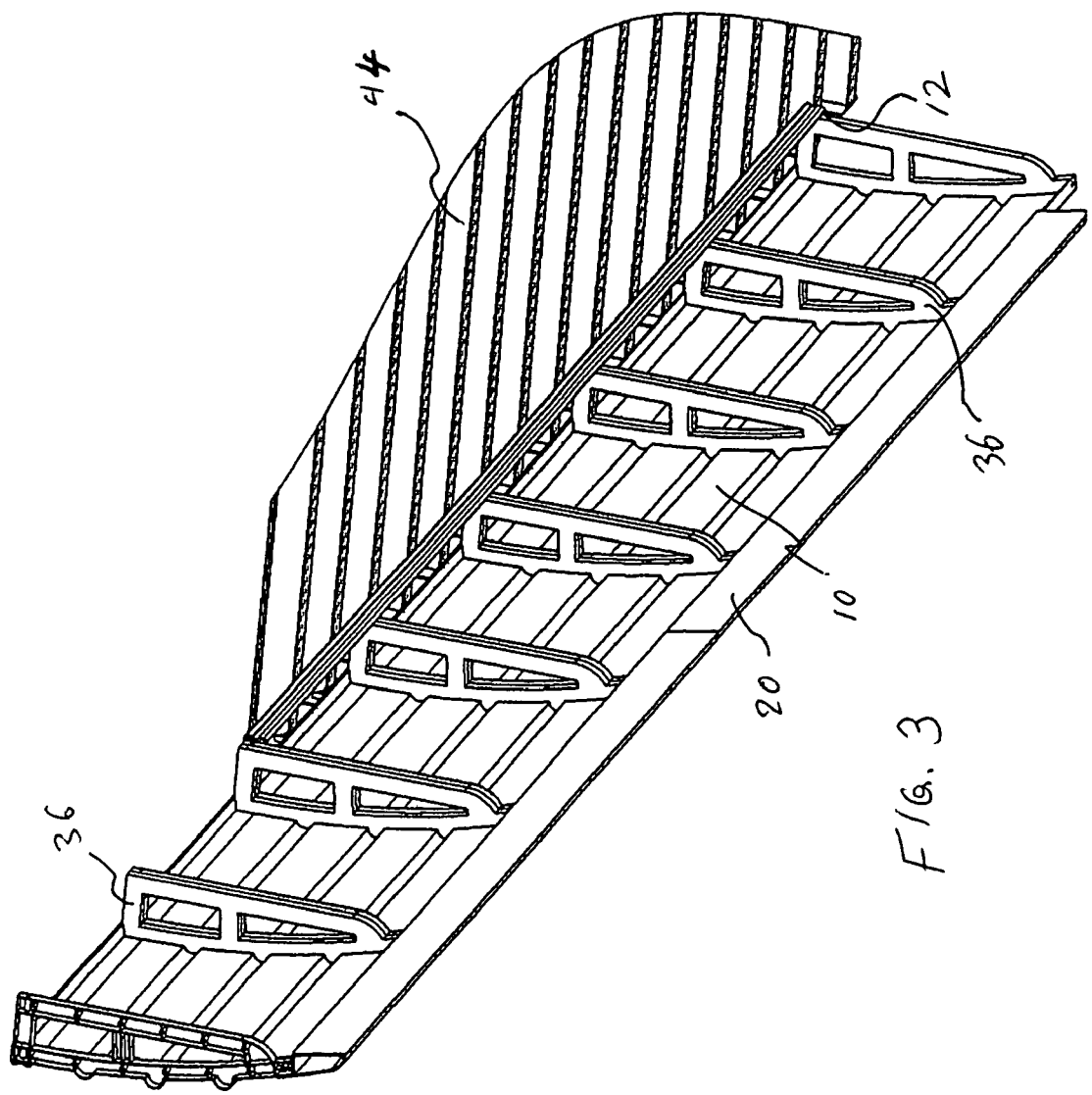
FIG. 3 is an isometric interior underside view of a portion of a tractor-trailer rig having a plurality of contiguous skirt panels as depicted in FIG. 1 attached thereto.

Description of FIG. 3

As seen in FIG. 3, this isometric interior underside view shows a plurality of abutting skirt panels 10 have been secured together by means of the reinforcing and connecting trusses 36. The so-formed interconnected panels 10 are secured to the I-beams 44 of the tractor-trailer rig (not seen here) through the intermediary of the extruded cap 12, which is superposed below the I-beams 44, and clips (to be described later).

Figure 4:
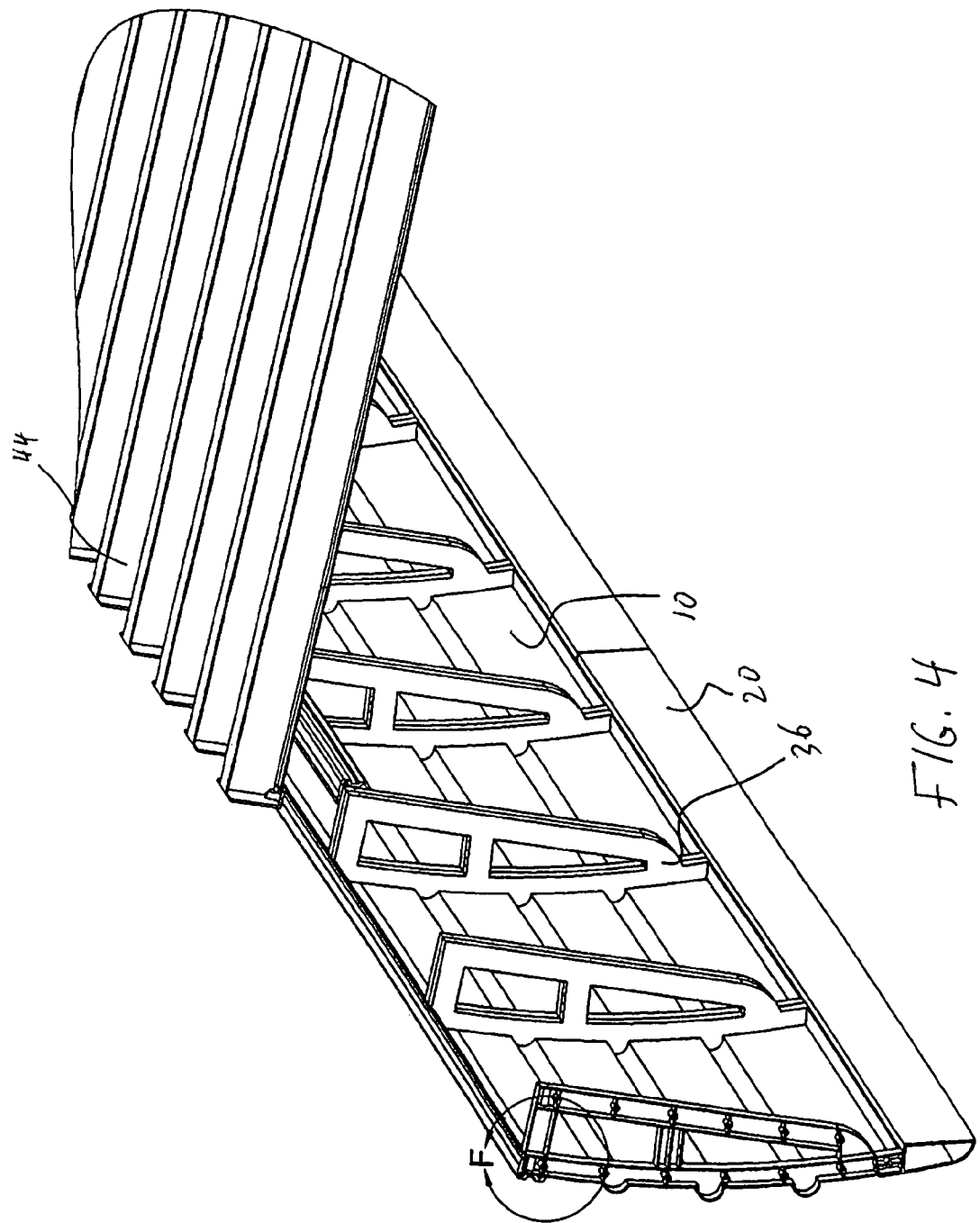
FIG. 4 is another isometric interior underside view of a portion of a tractor-trailer rig having a plurality of contiguous skirt panels as depicted in FIG. 1 attached thereto.

Description of FIG. 4

As seen in FIG. 4, this isometric interior underside view shows a plurality of abutting skirt panels 10 have been secured together by means of the reinforcing and connecting trusses 36. The so-formed interconnected panels 10 are secured to the I-beams 44 of the tractor-trailer rig (not seen here) through the intermediary of the extruded cap 12, which is situated below the I-beams 44, and by clips (to be described later).

Figure 5:
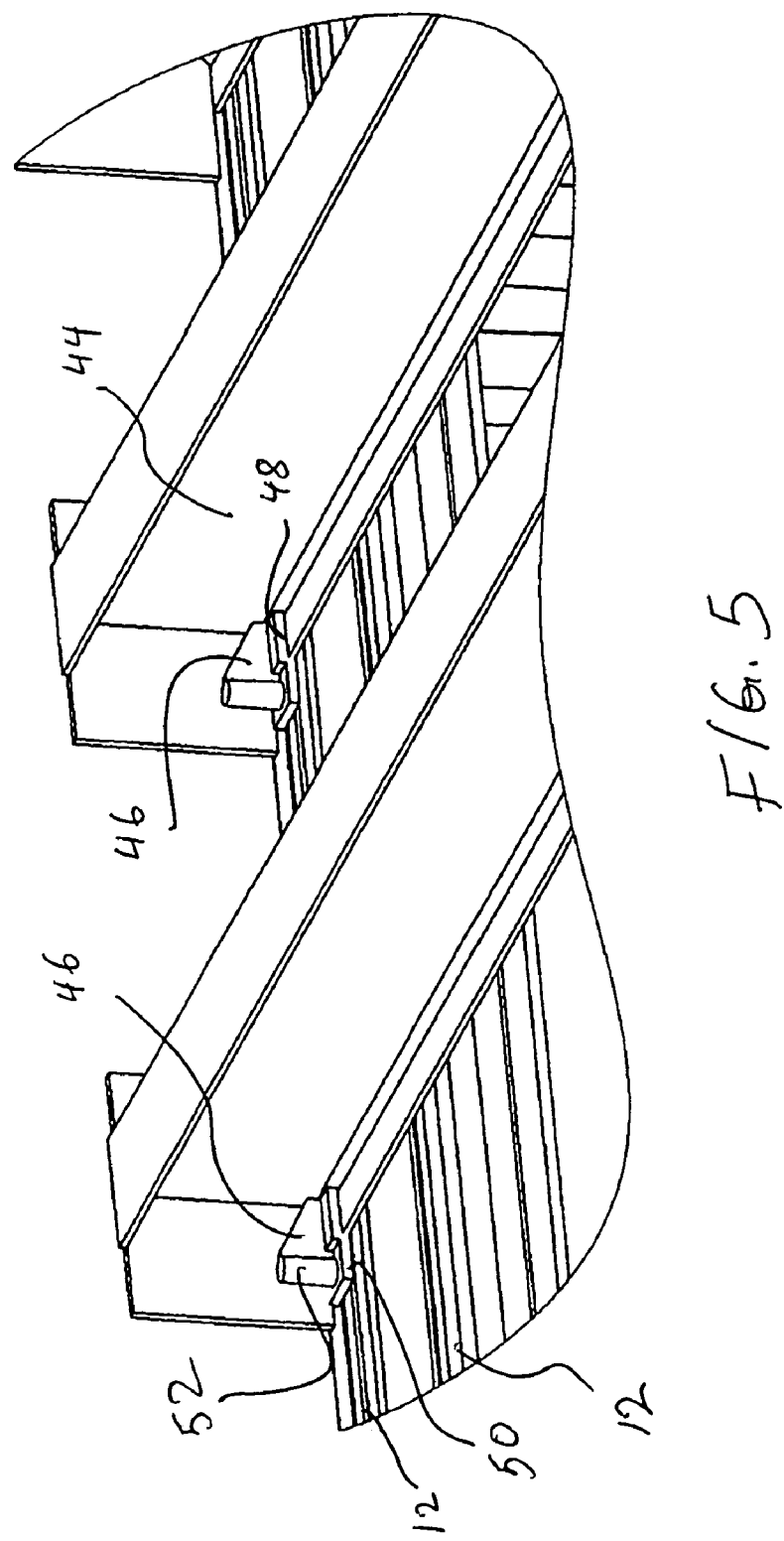
FIG. 5 is an isometric interior view of the I-beams of the tractor-trailer rig, having a plurality of contiguous skirt panels as depicted in FIG. 1 attached thereto, showing one means for fastening the skirt panel to the tractor-trailer rig.

Description of FIG. 5

As seen in FIG. 5, this isometric interior view shows one means of connecting the I-beams 44 to the extrusions 12 of the skirt panel 10. These means are a clip 46, one end 48 of which rests atop the lower edge of the I-beam 44, while the other end 50 is secured to the extrusion 12 by means of a screw 5.

Description of FIG. 6

As seen in FIG. 6, this isometric interior view shows that a plurality of abutting skirt panels 10 have been secured together by means of the reinforcing and connecting trusses 36. The so-formed interconnected panels 10 are secured to the I-beams 44 of the tractor-trailer rig (not seen here) through the intermediary of I-beam clamps 54 secured to the top 56 of support strut 58. The construction of support strut 58 will be described in detail with reference to FIG.

Description of FIG. 7

As seen in FIG. 7, this isometric interior underside view shows that a plurality of abutting skirt panels 10 have been secured together by means of the reinforcing and connecting trusses 36. The so-formed interconnected panels 10 are secured to the I-beams 44 of the tractor-trailer rig (not seen here) through the intermediary of I-beam clamps 54 secured to the top 56 of support strut 58. The I-beam clamps 54 include two spaced-apart elements 60 between which the two spaced-apart lower horizontal portions 62 of the I-beam 44 are placed. The two spaced-apart elements 60 of the I-beam clamps 54 are urged together and then secured in place, thereby locking the I-beam 44 to the support strut 58.

Figure 8A:
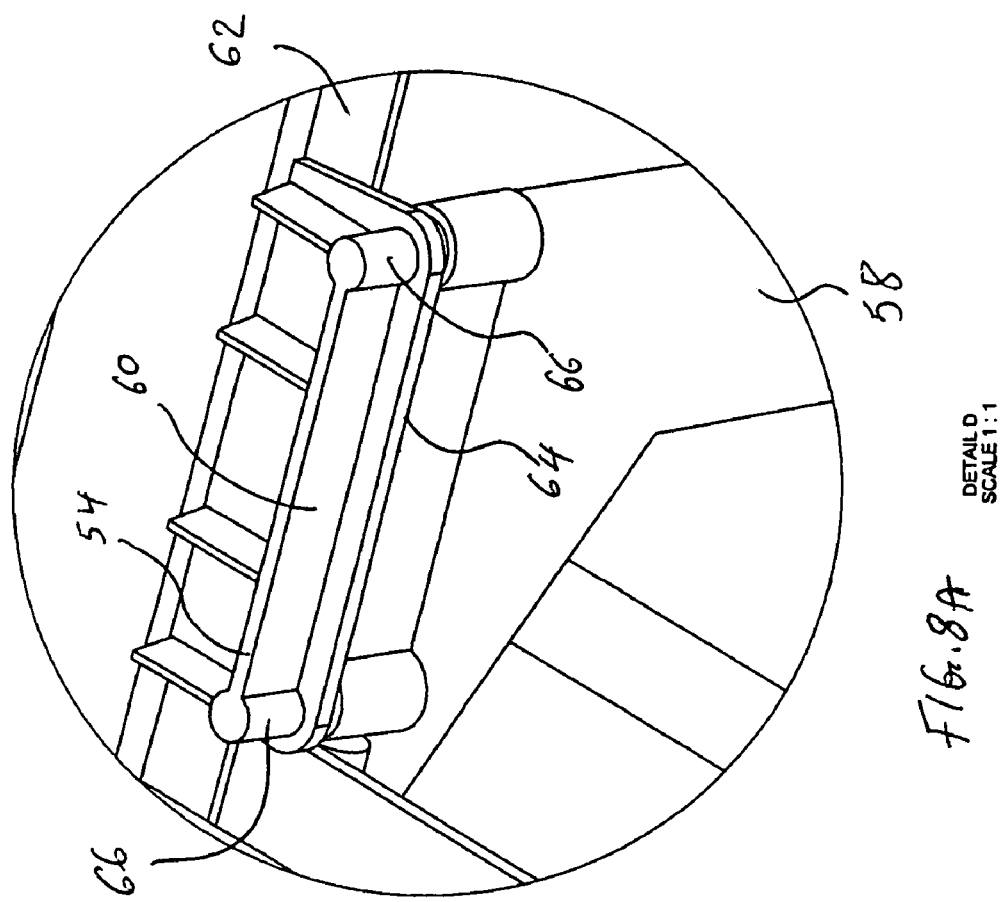
FIG. 8 is still another isometric interior view of a portion of a tractor-trailer rig having a plurality of contiguous skirt panels as depicted in FIG. 1 attached thereto, and including, as FIG. 8A, an enlarged view of the support strut connection detail.
Figure 8:
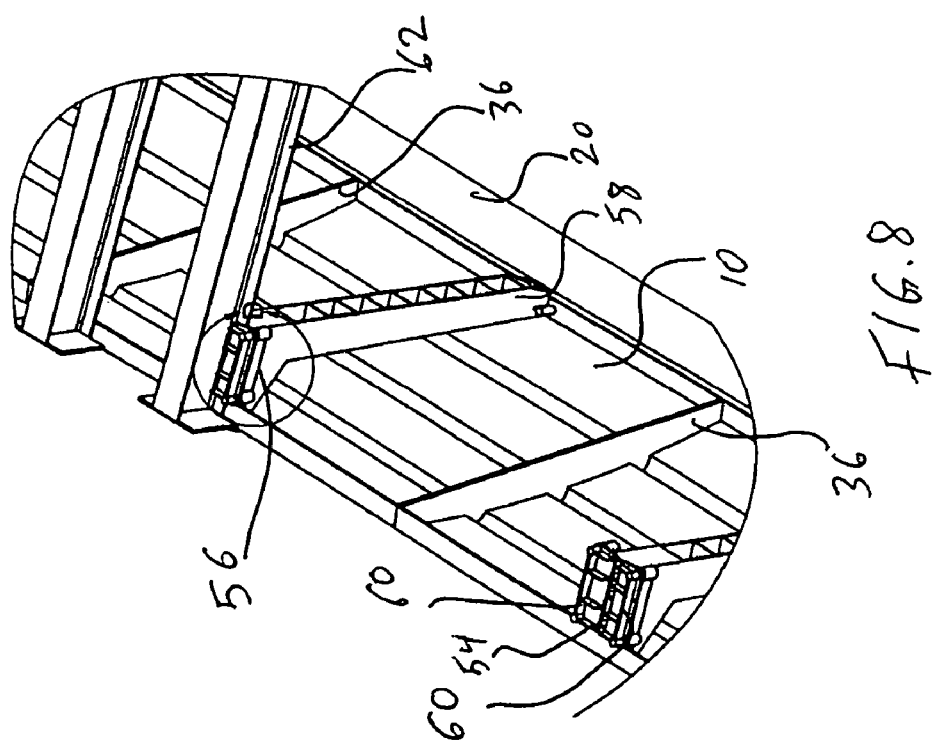

Description of FIG. 8 and FIG. 8A

As seen in FIG. 8, this isometric interior view shows that a plurality of abutting skirt panels 10 have been secured together by means of the reinforcing and connecting trusses 36. The so-formed interconnected panels 10 are secured to the I-beams 44 of the tractor-trailer rig (not seen here) through the intermediary of I-beam clamps 54 secured to the top 56 of support strut 58. The I-beam clamps 54 include two spaced-apart elements 60 between which the two spaced-apart lower horizontal portions 62 of the I-beam are placed. The two spaced-apart elements 60 of the I-beam clamps 54 are urged together and then secured in place, thereby locking the I-beam 44 to the support strut 58.

FIG. 8A shows the structure of the I-beam clamp 54 more clearly and shows how screws 66 secure the I-beam clamp 54 to the top edge 64 of the strut 58.

Figure 9:
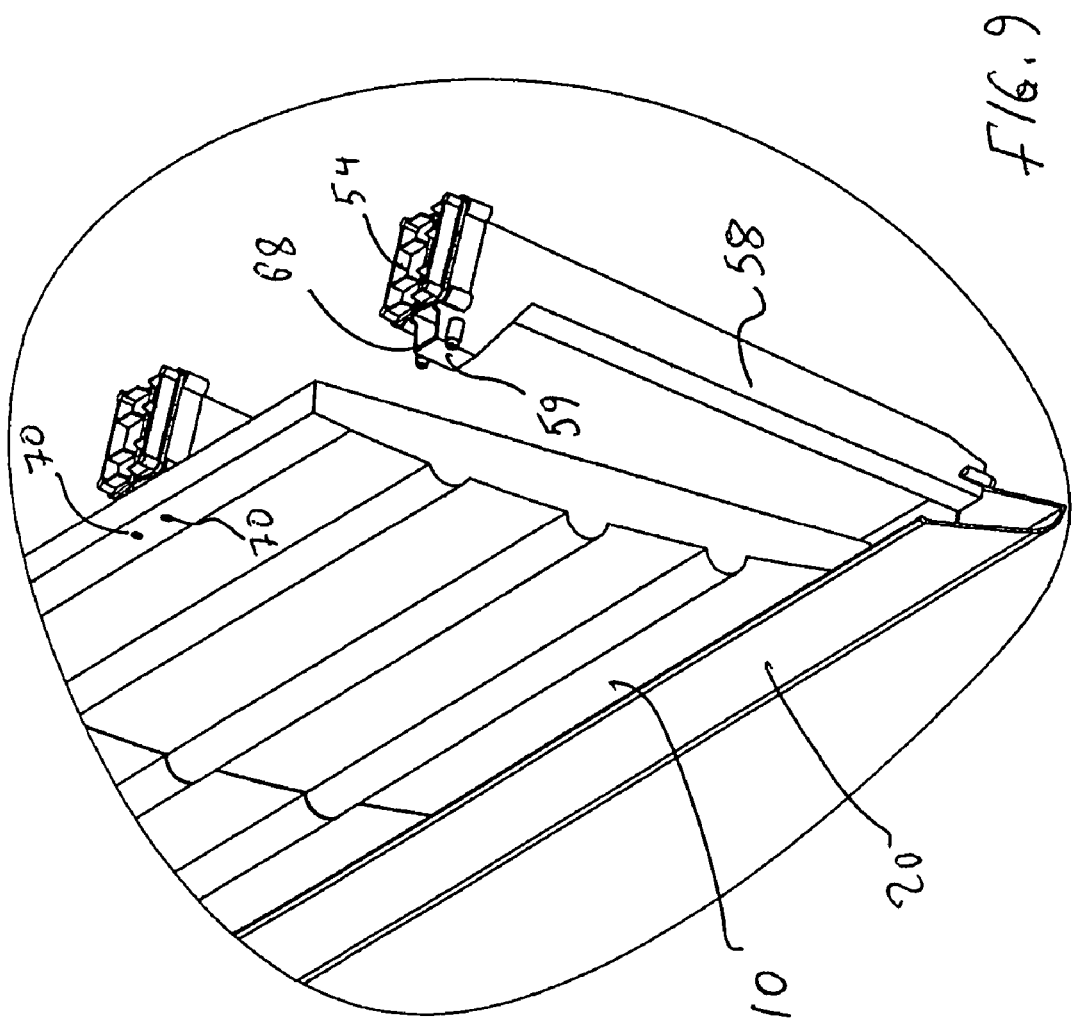
FIG. 9 is an isometric exterior view of one of a plurality of contiguous skirt panels as depicted in FIG. 1, showing one means for fastening the skirt panel to I-beams of the tractor-trailer rig by way of a support strut.

Description of FIG. 9

FIG. 9 shows how the support strut 58 is secured to the skirt panels 10. The securement is by way of two tapped cylindrical projections 68 extending outwardly from the interior face 59 of the strut 58. These cylindrical projections 68 are inserted through two spaced-apart drilled holes (unnumbered) in skirt panel 10 and are secured therein by means of screws 70.

Figure 10:
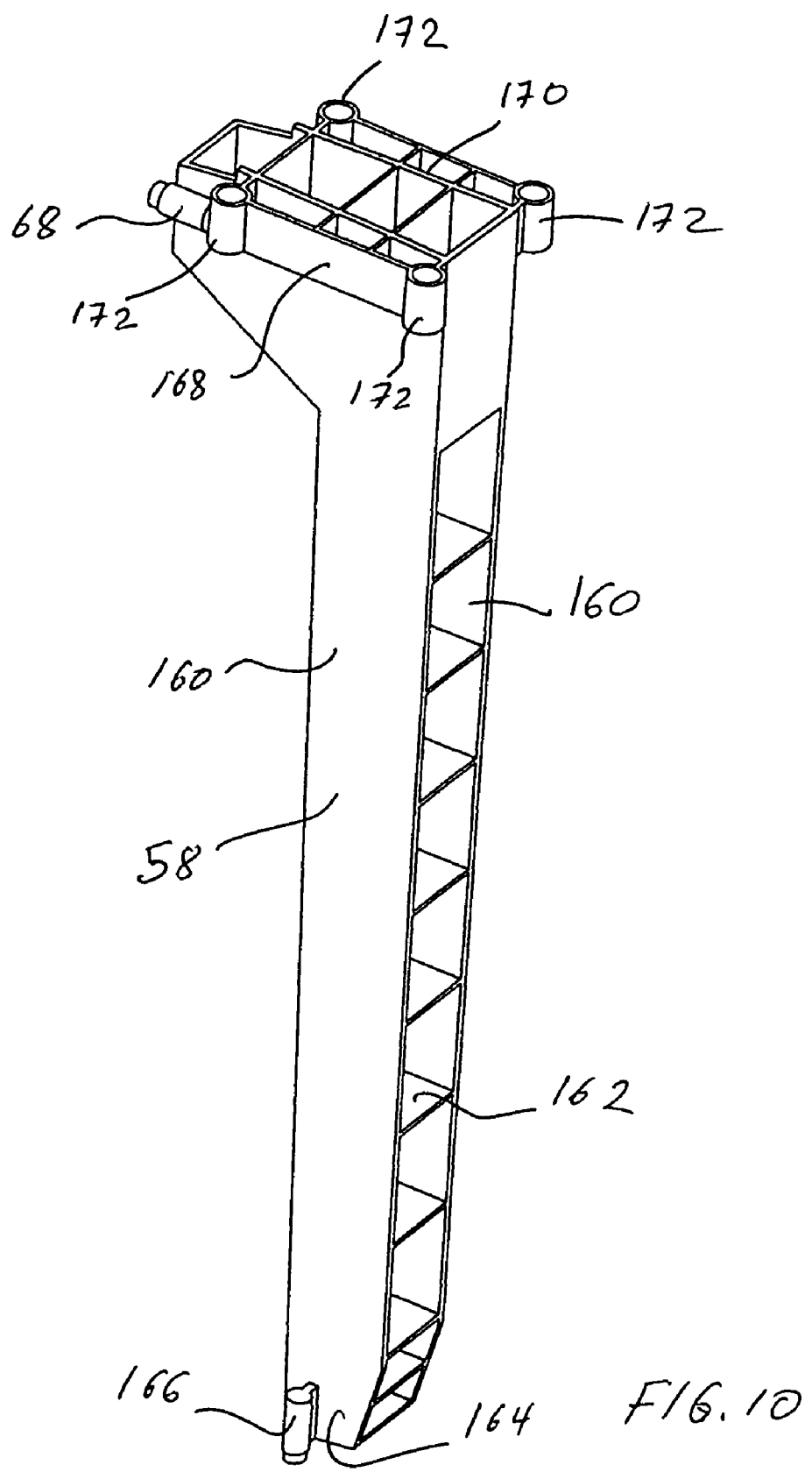
FIG. 10 is an isometric interior view of a typical support strut construction detail.

Description of FIG. 10

FIG. 10 shows the construction of the strut 58. As seen, strut 58 included a pair of spaced-apart vertical members 160, which are braced by horizontal cross-members 162. The lower edge 164 of strut 58 includes a pair of cylindrical protrusions which act as screw points 166. The upper edge 168 of the strut 58 includes a reinforcing rectangular lattice 170. At each corner thereof is a cylindrical protrusion 172 that act as screw points. Projecting outwardly from the forward edge of the lattice 170 are the hereinbefore-described projecting cylindrical members 68, which act as screw points.

Figure 11A:
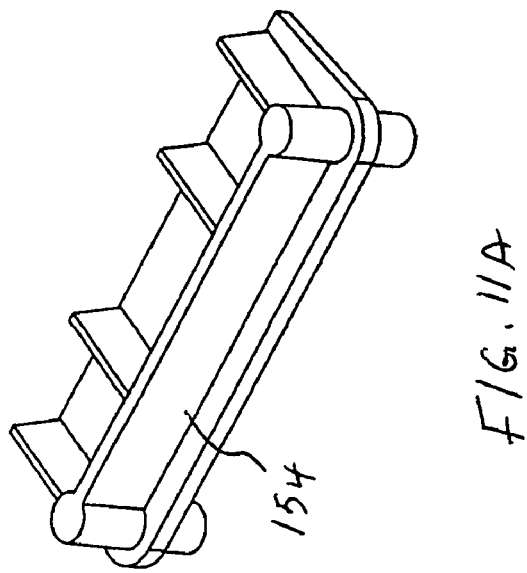
FIG. 11 is an isometric rear view of another typical skirt panel with another form of reinforcing and interconnection means, according to one embodiment of the present invention, and including, as FIG. 11A, an enlarged view of an I-beam connection clamp.
Figure 11:
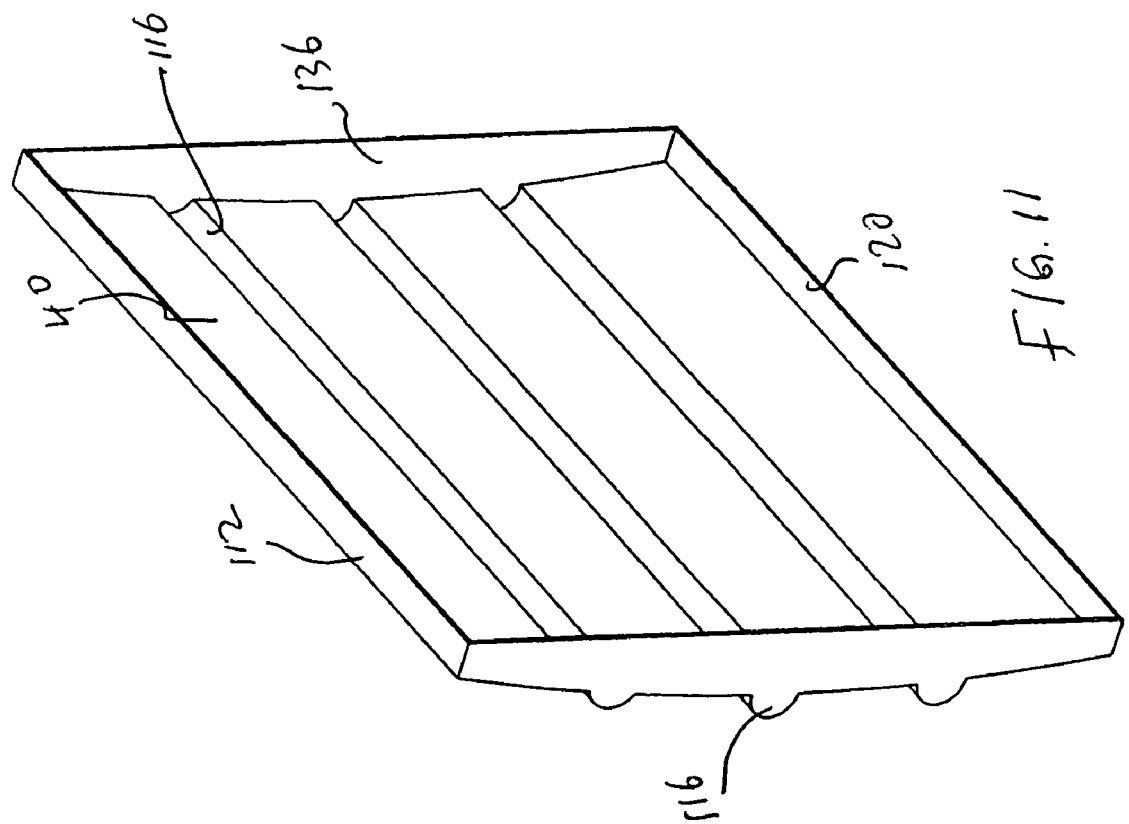

Description of FIGS. 11, and 11A

FIG. 11 shows another embodiment of the skirt panel 110. As seen in FIG. 11, the skirt panel 110 is a generally-rectangular flat of thin thermoplastic material e.g., ABS (acrylic/butadiene/styrene resin) with an integral cap 112. The exterior face of the skirt panel 110 is formed with integral, spaced-apart, horizontal arcuate protrusions 116. The lower edge 118 of the skirt panel 110 includes an integral base 120. While not shown, base 120 may include a flexible depending panel, which, as previously described allows flexing of the final skirt panel 110 over road objects (e.g., curbs, rail road tracks and below grade loading docks).

As seen in FIG. 11A, the embodiment of the I-beam clamp 154 is made of a suitable plastic material e.g., NYLON 6

Figure 12:
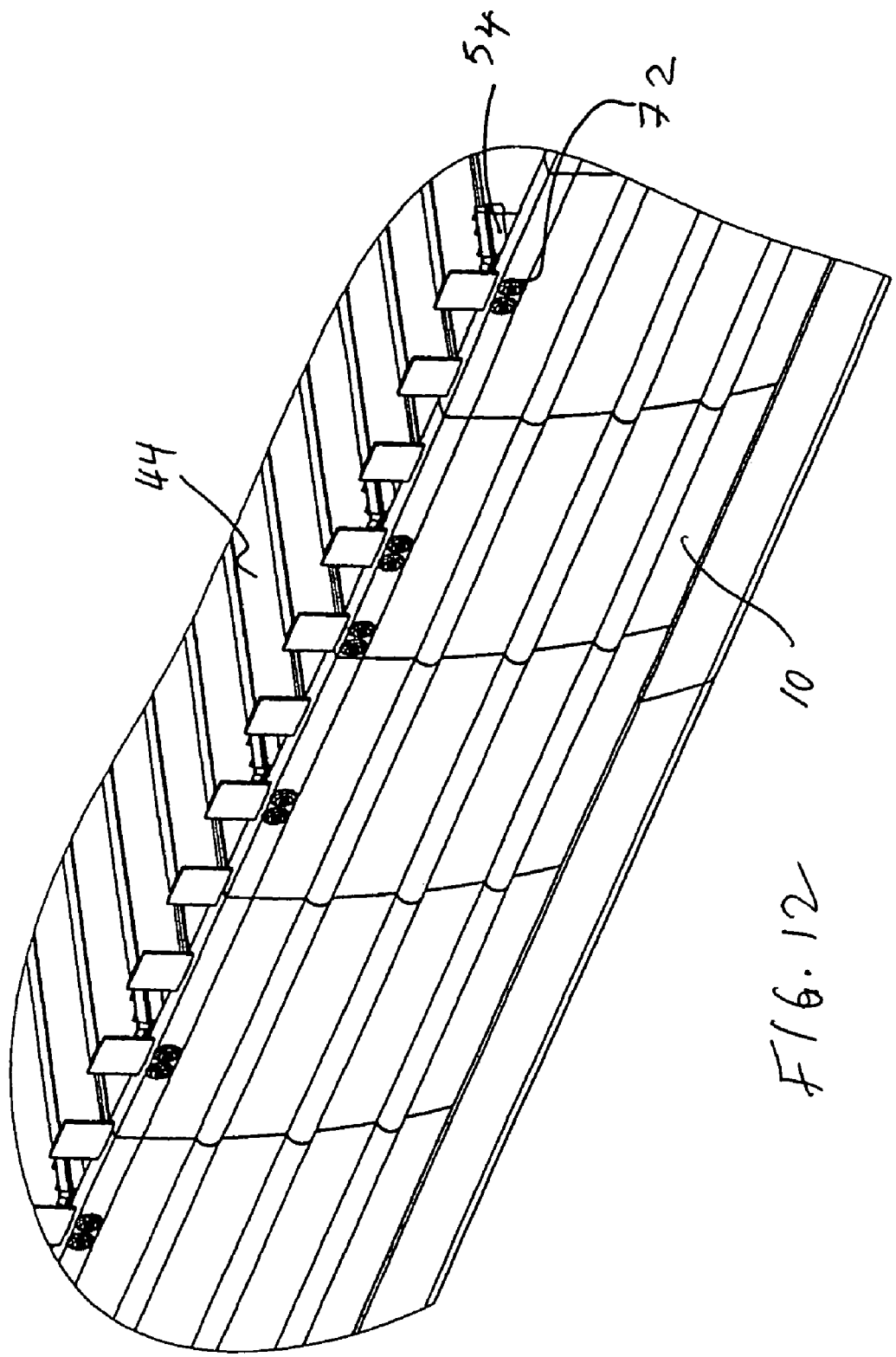
FIG. 12 is an isometric exterior view of a series of interconnected skirt panels showing the connection to the I-beam of the tractor-trailer rig.

Description of FIG. 12

FIG. 12 is an isometric exterior view of a series of interconnected skirt panels 10, which shows the exterior of the lower edge of the tractor-trailer rig (not seen) with the plurality of interconnected skirt panels 10 secured to the I-beams 44. The securement is by way of a plurality of Plastite screws 72 which connect the skirt panel 10 to the I-beam clamp 54.

Figure 13:
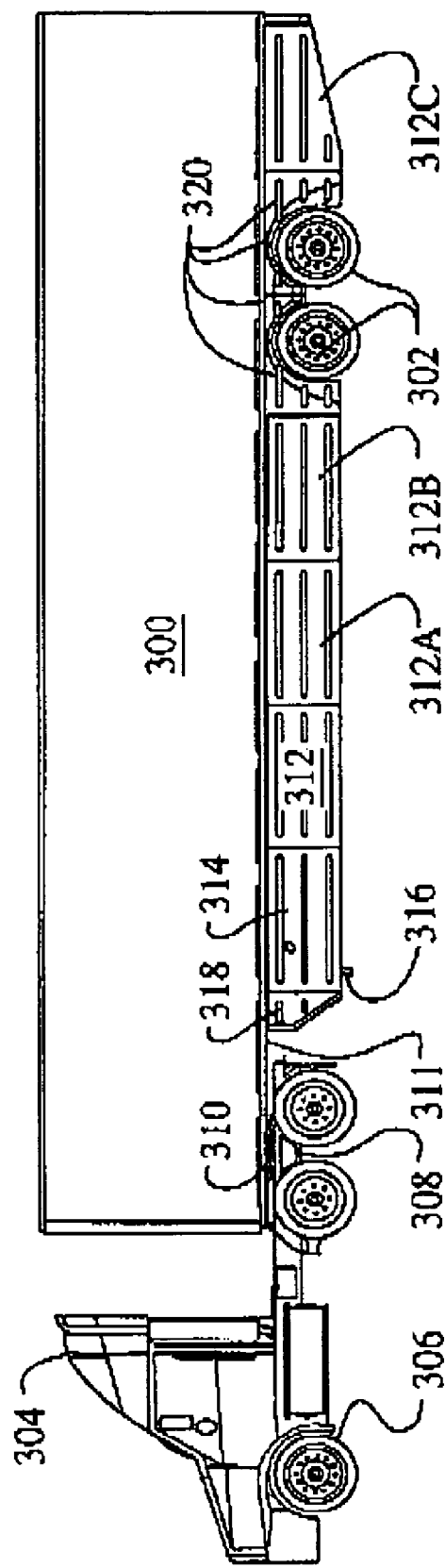
FIG. 13 is a side elevational view of a tractor-trailer rig equipped with a plurality of contiguous skirt panels as depicted in FIG. 1.

Description of FIG. 13

As seen in FIG. 13, a tractor-trailer rig 300 provided with right and left (not seen) rear wheel bogeys 302 is attached to a vehicle cab 304 equipped with right and left (not seen) front wheels 306 and right and left (not seen) rear wheel bogeys 308 by means of a fifth wheel 310. The tractor-trailer rig 300 is provided with a fairing which depend from a lower, outer longitudinally extending edge 311 of the tractor-trailer rig 300 and which comprises a plurality of contiguous skirt panels 312, 312A, 312B, 312C which generally have the structure of the skirt panels 10 which have been described above in connection with the description of FIG. 1, as well as skirt panels 318, 314 and 320. However, the front skirt panel 314 of the plurality of continuous skirt panels 312 provides a facing for a depending strut 316 of the tractor-trailer rig 300. The skirt panel 318, which is immediately forward of front panel 314 is generally trapezpidally shaped to provide an aerodynamic profile to the contiguous skirt panels 312. Moreover, a special arrangement of skirt panels 320 are provided having a special configuration and are disposed around the rear wheel bogfeys 302.

VACUUM FORMED PANEL METHOD

By this method, the skirt panels are produced using three aluminum moulds. The moulds contain inner copper cooling and heating lines, which aid in the manufacturing method. The mould also contains an insert, which can be removed to form a side marker light panel. Each mould can produce either the right panel or the left panel.

The skirt material used in this method is a thin sheet, e.g. about 0.187 " thin, of a thermoplastic material, e.g., co-extruded ABS (acrylic/butadiene/styrene resin) with a CENTREX or LURAN cap. (Luran® is the Trademark of BASF for its brand of a styrene acrylonitrile copolymer which has been impact-modified with acrylic ester rubber.) The thin sheet of thermoplastic material is held in a clamp frame, which is introduced to a heating oven. The thin sheet of thermoplastic material is heated to a suitable temperature, e.g., for ABS about 320° F. The heated thin sheet of thermoplastic material is then placed over the aluminum mould. The mould is forced into the hot thin sheet of thermoplastic material until an air seal is formed around the outer edge of the mould (such air seal being known as a "sealing flange"). A vacuum is then drawn from inside the mould, which forces the hot thin sheet of thermoplastic material, e.g., ABS, to form around the contours of the mould. Cooling fans then reduce the temperature of the thin sheet of thermoplastic material to a suitable temperature, e.g., for ABS, a temperature down to about 140° F. The clamp frame is opened and the formed first intermediate skirt panel is removed from the mould. Excess material is trimmed off from the formed first intermediate skirt panel, and suitable mounting holes are drilled.

The first intermediate skirt panel is further fabricated by cutting a metal, e.g., galvanized steel sheet which is stamped, and formed thereto to form the vertical truss' and clamp angles of the second intermediate skirt panel.

The fabrication of the final skirt panel is optionally completed by attaching extruded flex PVC, (polyvinyl chloride) or extruded Santoprene (the Trademark of Advanced Elastomer Systems LP for its brand of TPE-thermoplastic elastomers—a diverse family of rubber-like materials which can be processed and recycled like thermoplastic materials) to the lower edge of the second intermediate skirt panels. This allows flexing of the final skirt panel over road objects (e.g., curbs, rail road tracks and below grade loading docks). This also provides a means to achieve further fuel savings.

TWIN SHEET VACUUM FORMED PANEL METHOD

In this method, the skirt panels are produced using three double aluminum moulds. Each mould has a smooth outer skin side and a ribbed inner skin side. Both halves of the moulds contain inner copper cooling and heating lines, which aid in the manufacturing method. The mould also contains an insert, which can be removed to form a side marker light panel. Each mould can produce either the right panel or the left panel.

The skirt material used in this method is a thin sheet, e.g. about 0.100" thin, of a suitable thermoplastic material, e.g., co-extruded ABS (acrylic/butadiene/styrene resin) with a CENTREX or LURAN cap. (Luran® is the Trademark of BASF for its brand of a styrene acrylonitrile copolymer which has been impact-modified with acrylic ester rubber.) Two sheets of such thin thermoplastic material are required to produce each single panel. Each single sheet of thin thermoplastic material is held in a separate clamp frame. These two clamp frames are fixed in spaced-apart relationship one above the other with minimal clearance between them. The two sheets of such thin thermoplastic material in such clamp frames are then placed in a heating oven. The thin sheets of thermoplastic material are heated to a suitable temperature, e.g., for ABS about 320 degrees F. The heated thin sheets of thermoplastic material are then place one over each half of a respective aluminum mould. Each heated sheet of thin thermoplastic material is forced on to the associated separate mould halves until an air seal is formed around the outer edge of the mould. This is known as the sealing flange. A vacuum is then drawn from within each mould half. While the hot thin sheets thermoplastic material (ABS) is still hot, the two mould halves are clamped together. Enough pressure is applied to bond the areas of contact between the two materials to form a permanent single hollow first intermediate skirt panel. Cooling fans then reduce the temperature of the mould and the thermoplastic material to a suitable temperature, e.g., for ABS about 140 degrees F. The two mould halves and clamps are then opened to allow removal of the moulded first intermediate skirt panel. Excess material is then trimmed off from the formed first intermediate skirt panel and mounting holes are also drilled therein.

The first intermediate skirt panel is further fabricated by cutting a metal, e.g., galvanized steel sheet which is stamped, and formed thereto to form the vertical truss' and clamp angles of the second intermediate skirt panel.

The fabrication of the skirt panel is completed by attaching an optional extruded flex PVC, (polyvinyl chloride) or extruded Santoprene (the Trademark of Advanced Elastomer Systems LP for its brand of TPE-thermoplastic elastomers—a diverse family of rubber-like materials which can be processed and recycled like thermoplastic materials) to the lower edge of the second intermediate skirt panels. This allows flexing of the final skirt panel over road objects (e.g., curbs, rail road tracks and below grade loading docks). This also provides a means to achieve further fuel savings.

INJECTION MOULDED PANEL METHOD

These skirt panels are produced from a high-pressure injection mould or from a structural web injection mould.

A high-pressure mould is the typical steel male/female mould, which requires considerable pressure, e.g., about 2900 tons of clamping pressure, to force the molten thermoplastic material, e.g., ABS, PP, HMWPE, or TPO into the mould.

A structural web mould requires about ⅓ the amount of clamping pressure, e.g., about 970 tons of clamping pressure compared to the high pressure mould to force the molten thermoplastic material, e.g., ABS, PP, HMWPE, or TPO into the mould. This method also creates small voids within the wall structure, which act as a webbing in the formed first intermediate skirt panel. For this reason a slightly better stiffness for a given wall thickness can be achieved.

The advantage of injection moulding over the two above-described thermoforming methods includes the following: use of less raw material, thus reducing cost; provides quicker cycle times and a net increase in formed parts; provides a finished part upon de-moulding; no additional production steps are required; provides a reduction in the amount of support structure and fastening required; provides the ability to increase the speed and ease of product installation; and provides the ability to offer greater flexing of the panel as it passes over road objects (e.g., curbs, rail road tracks and below grade loading docks) due to live hinges and/or notches in panel ribs. The panel can also use snap-in features verses nut/bolt fastening.

In this method, the skirt panel is composed of two or optionally three or four eventually monolithic components. The first component is the face panel and one is required for each skirt panel. This face panel is produced using a high-pressure injection mould. The thermoplastic material is preferably ABS, HMW polyethylene, PP or TPO.

The second component is a support strut and one is required for each skirt panel. This strut is produced using a high-pressure injection mould. The thermoplastic material is preferably ABS, HMW polyethylene, PP or TPO.

The third optional component is a track. The track is an extruded thermoplastic material component of e.g., ABS, HMW polyethylene, PP or TPO.

The support strut is integrated optionally to the track and to the face panel to form an intermediate skirt panel.

The fourth optional component is an extruded flexible lower panel component of e.g., SANTOPRENE or PVC. This lower panel component is attached to the lower edge of the intermediate skirt panel to provide the final skirt panel. This allows flexing of the final skirt panel over road objects (e.g., curbs, rail road tracks and below grade loading docks). This also provides a means to achieve further fuel savings.

CONCLUSION

As will be readily appreciated from the foregoing, the skirt panel of aspects of the present invention is a lightweight, dimpled or scaled surface, slightly curved structure designed to control airflow on the lower sides of a conventional trailer. The slightly curved structure is positioned parallel to and below the sides of the trailer extending from forward of the trailer wheels to just after the tractor wheels, and it extends as close as practical to the ground. The skirt can extend around the trailer wheels and/or aft of the trailer wheels extending back to the rear tailgate. The skirt panel optionally includes a lower flexible panel, which allows flexing of the final skirt panel over road objects (e.g., curbs, rail road tracks and below grade loading docks).

What is claimed is:

1. A skirt panel for interconnection to another similar skirt panel for attachment beneath a lower, outer longitudinally-extending edge of tractor-trailer rig including not only a front wheel bogey and a rear wheel assembly, thereby to provide s continuous fairing extending downwardly from said tractor-trailer rig, each said skirt panel comprising:
    a monolithic, generally-rectangular composite reinforced thermoplastic structure;
    a first reinforcing structure comprising s reinforcing and connecting truss structure, said first reinforcing structure being operatively associated with an exterior facing edge of said skirt panel, and including outwardly extending connecting points;
    a second reinforcing structure comprising lateral edge vertical reinforcing trusses, said reinforcing and connecting trusses having connection points to enable abutting similar skirt panels to be rigidly connected to one another;
    a top edge, said top edge including a cap structural members for rigidly securing said skirt panel to said tractor-trailer rig;
    a lower edge;
    a front face of said monolithic, generally-rectangular composite reinforced thermoplastic structure being provided with a plurality of longitudinally-extending, vertically-spaced-apart arcuate protrusions; and
    an exterior face of said skirt panel, which includes said reinforcing and connecting trusses and said connection points, also including a plurality of horizontal arcuate protrusions;
    whereby, when said fairing is secured to a lower portion of said trailer said fairing extends downwardly from said tractor-trailer rig to from 60% to 80% of distance to the road, so that a portion of any impinging air is directed laterally around said wheels of said rear wheel bogeys to reduce the aerodynamic drag of said trailer and of said wheel assembly.

2. The skirt panel of claim 1, wherein said top edge of said skirt panel includes structural members for rigidly securing said skirt panel to said tractor-trailer rig.

3. The skirt panel of claim 2, wherein said structural members for rigidly securing said skirt panel to said trailer comprises snap members.

4. The skirt panel of claim 1, wherein said trusses of said first reinforcing structure and of said second reinforcing structure are formed of stamped metal.

5. The skirt panel of claim 4, wherein said stamped metal comprises galvanized steel vertical truss and securement members which are secured to said thermoplastic portion of said skirt panel.

6. The skirt panel of claim 1, wherein said trusses of said first reinforcing structure and of said second reinforcing structure truss are of an open lattice structure.

7. The skirt panel of claim 1 wherein said two lateral vertical side edges extend inwardly from a rear face thereof, and wherein said top and lower edges thereof are integrally connected to said two inwardly extending lateral edges.

8. The skirt panel of claim 1, including a further support strut connected to an interior face thereof at said lower edge and is secured to said interior face adjacent said top edge thereof.

9. The skirt panel of claim 8, wherein said support strut includes an I-beam clamp at an upper edge thereof.

10. The skirt panel of claim 8, wherein said interior face of said strut at an upper edge thereof includes members to connect said strut to said interior face of said skirt panel.

11. The skirt panel of claim 1, wherein said thermoplastic is selected from the group consisting of co-extruded ABS with a cap of a styrene acrylonitrile copolymer which has been impact-modified with acrylic ester rubber, high molecular weight polyethylene, polypropylene and TPO.

12. The skirt panel of claim 1, including a thinner, more flexible synthetic plastic lower panel, said thinner, more flexible synthetic plastic lower panel being attached to said lower edge of said skirt panel, thereby to allow panel flexing over road objects, e.g., curbs, railroad tracks and below grade loading docks.

13. The lower panel of claim 12, wherein said synthetic plastic comprises a thermoplastic elastomer.

14. The lower panel of claim 12, wherein said thermoplastic elastomer comprises flex PVC.

15. The skirt panel of claim 1, which is about 0.187 inches thin.

* * * * *